United States Patent [19]

Towers et al.

[11] Patent Number: 5,601,385

[45] Date of Patent: Feb. 11, 1997

[54] APPARATUS FOR FITTING AND DRILLING BOWLING BALLS

[75] Inventors: Bill E. Towers, Belmont, Mich.; Ladislav Jurik, Brookfield; Richard L. Weinbrenner, Lemont, both of Ill.

[73] Assignee: Brunswick Bowling & Billiards, Muskegon, Mich.

[21] Appl. No.: 336,143

[22] Filed: Nov. 14, 1994

[51] Int. Cl.⁶ .................................................. B23B 41/00
[52] U.S. Cl. ........................... 408/3; 33/510; 269/126; 269/287; 364/474.02; 364/474.22; 408/13; 408/89; 408/104; 408/DIG. 1
[58] Field of Search ...................... 33/510; 364/474.02, 364/474.22; 408/3, 13, 89, 91, 103, 104, 105, 241 R, DIG. 1; 269/71, 126, 287

[56] References Cited

U.S. PATENT DOCUMENTS

| | | | |
|---|---|---|---|
| 2,269,946 | 1/1942 | Lange | 408/DIG. 1 |
| 2,393,026 | 1/1946 | Dietz et al. | |
| 2,393,908 | 1/1946 | Hubbard | |
| 2,460,385 | 2/1949 | Hausman | |
| 2,475,876 | 7/1949 | Campi | |
| 2,844,375 | 7/1958 | Nestor | |
| 2,879,679 | 3/1959 | Neff | |
| 2,936,177 | 5/1960 | Dietz | |
| 3,001,793 | 9/1961 | Insetta | |
| 3,012,783 | 12/1961 | Bunk et al. | |
| 3,095,767 | 7/1963 | Jesonis | |
| 3,102,725 | 9/1963 | Jarus | |
| 3,129,002 | 4/1964 | Bednash | |
| 3,137,074 | 6/1964 | Jesonis | 408/DIG. 1 |
| 3,143,901 | 8/1964 | Bawtinheimer | |
| 3,197,206 | 7/1965 | Yettito | |
| 3,271,870 | 9/1966 | Blaker et al. | 408/DIG. 1 |
| 3,304,814 | 2/1967 | Scott | 408/104 |
| 3,329,043 | 7/1967 | Stanford | 408/DIG. 1 |
| 3,382,740 | 5/1968 | Lotta | |
| 3,415,146 | 12/1968 | Schroeder, Jr. | 408/DIG. 1 |
| 3,465,619 | 9/1969 | Blaker et al. | |
| 3,804,412 | 4/1974 | Chetirko | |
| 4,289,312 | 9/1981 | Heimbigner | |
| 4,358,112 | 11/1982 | Straborny | |
| 4,381,863 | 5/1983 | Norman | |
| 4,432,546 | 2/1984 | Allen, Jr. | |
| 4,632,396 | 12/1986 | Taylor | |
| 4,773,645 | 9/1988 | Todd et al. | |
| 4,892,308 | 1/1989 | Gaunt | |
| 4,968,033 | 11/1990 | Aluotto | |
| 5,002,276 | 3/1991 | Bernhardt | |
| 5,118,106 | 6/1992 | Goldman | |
| 5,427,478 | 6/1995 | Boucher et al. | 408/DIG. 1 |

*Primary Examiner*—Daniel W. Howell
*Attorney, Agent, or Firm*—Wood, Phillips, VanSanten, Clark & Mortimer

[57] ABSTRACT

Delays in fitting and drilling bowling balls are eliminated in a point of sale bowling ball fitting and drilling apparatus. A fitting apparatus (30) includes two movable finger blocks (34), (36) and a thumb aperture (38). Through the use of inserts taken from a group of inserts (150), the fitting apparatus (30) may be utilized to generate control signals to a drilling apparatus (46). A ball (204) may be positioned within the drilling apparatus (46) and insert receiving holes drilled therein in response to the information received by the drilling apparatus (46) from the fitting apparatus (30).

34 Claims, 15 Drawing Sheets

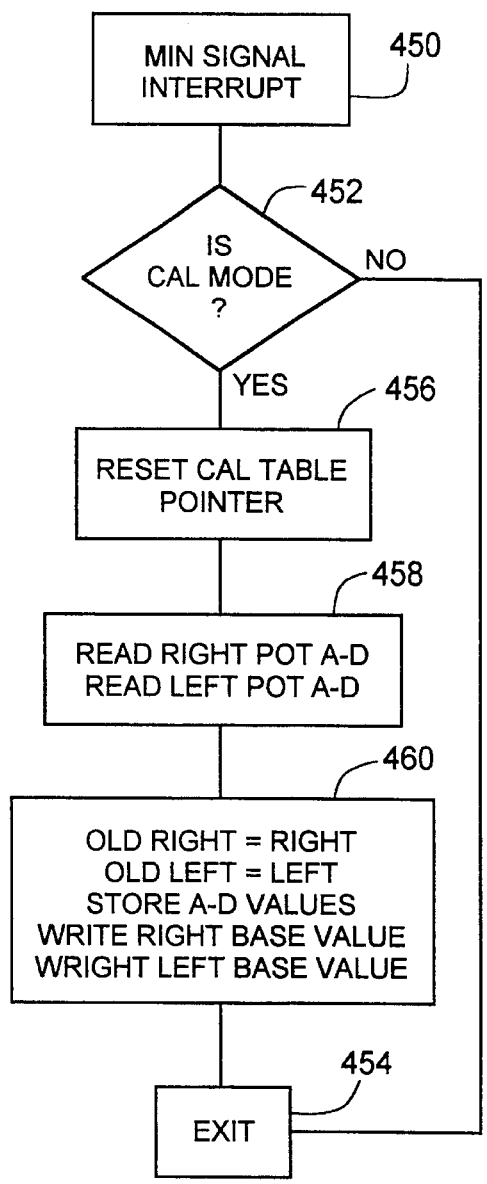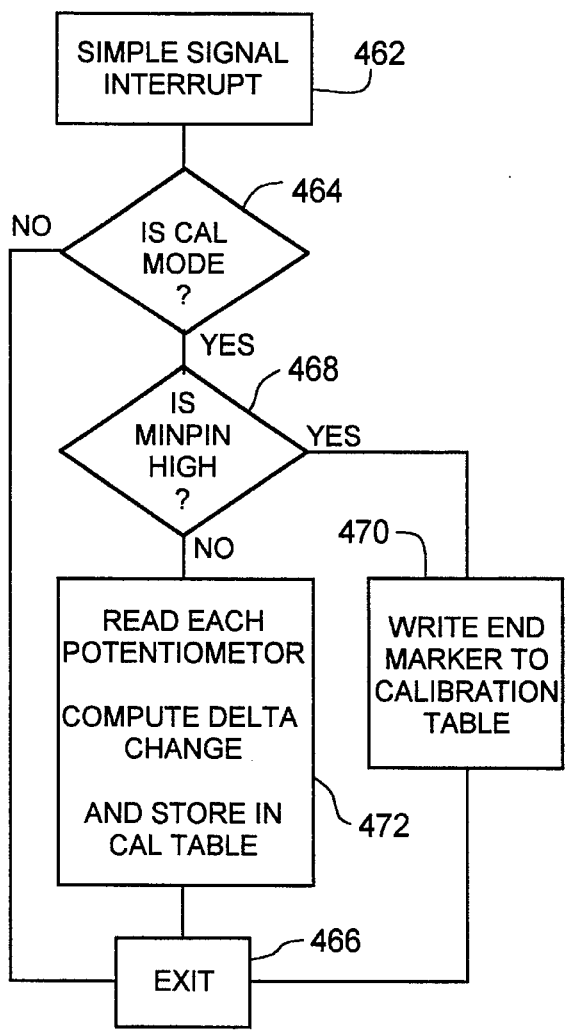

APPARATUS FOR FITTING AND DRILLING BOWLING BALLS

FIELD OF THE INVENTION

This invention relates to bowling games, and more particularly, to bowling balls used in such games. Specifically, the invention relates to fitting a ball to a bowler and drilling finger holes in the ball after it has been fitted.

BACKGROUND OF THE INVENTION

As is well known, a bowler purchases a new bowling ball in a form that is free from finger holes. In the usual case, the ball is sold with an index mark which is generally intended to be located centrally of the finger holes. Holes are drilled about the index mark, typically for receipt of the middle finger and the ring finger on one side of the index mark and a hole for the thumb on the opposite side thereof.

The holes may be bored to various diameters to fit the finger size of the bowler. Typically, thumb hole and finger hole diameters will range from $5/8$ of an inch to $1\ 3/22$ of an inch.

Other dimensions of concern include the "span" and the "bridge".

Span is the distance between the near edges of the thumb hole and either of the finger holes, whereas bridge is the distance between the near edges of the two finger holes. "Pitch" is still another parameter. Pitch is the distance between the center line of a finger or thumb hole and a parallel radius of the ball. As can be readily imagined, with the number of variables involved, drilling the finger holes in a bowling ball is not a job to be relegated to the ordinary man on the street.

Generally, then, the balls are purchased at stores that specialize in bowling goods and/or bowling "pro" shops where there is sufficient traffic in bowling ball sales to justify the presence of a ball drilling machine as well as an experienced operator for the drilling apparatus. In addition, it is necessary that there be a person in attendance who is knowledgeable in fitting a ball to a bowler so that the proper hole diameters, span, pitch and bridge may be determined to set the parameters for the drilling operation.

It is believed that the foregoing situation has deterred many bowlers from buying their own balls, the bowlers relying instead on so called "house" balls maintained in most bowling establishments for use by patrons who do not own their own balls. For example, frequenting such a store specializing in bowling goods to make the purchase of a bowling ball is a less likely occurrence than a person frequenting a mass merchandiser, discount warehouse or the like. Consequently, the purchase of a bowling ball by many is put off, or does not occur at all because of this factor.

The problem may be compounded because many such establishments are relatively small and do not have the personnel available to fit the ball and then drill it during a single visit by the patron. Frequently, the ball will be fitted during regular store hours, but will not be drilled until after store hours, necessitating a return trip by the purchaser to pick-up the drilled ball.

Thus, there is a real need for an inexpensive, simple and sure means for fitting a ball to a bowler and drilling the same.

SUMMARY OF THE INVENTION

It is a principal object of the invention to provide new and improved means for fitting a ball to a bowler. It is also a principal object of the invention to provide a new and improved means for drilling a bowling ball.

It is still a further principal object of the invention to provide a system that integrates a means for fitting a bowling ball and a means for drilling a bowling ball such that balls may be fitted and drilled in essentially one operation.

It is also an object of the invention to provide such means that are simple and easy to operate and do not require an experienced operator.

According to one facet of the invention, the foregoing objects are achieved in an apparatus for fitting a bowling ball to the hand of a user which includes a first finger block including a first bore, a finger block including a second bore, a frame, means including a third bore in the frame and means mounting the finger blocks on the frame in generally side by side relation and for movement toward and away from the third bore. Means are provided in the frame and connected to the finger blocks for generating a signal representative of the distance between each of the finger blocks and the third bore.

In a preferred embodiment, the third bore is stationary relative to the frame.

In a highly preferred embodiment, the bores are all sized to receive inserts from a set of inserts, each insert of the set having a finger hole therein.

In a preferred embodiment, the inserts are generally cylindrical and the finger holes in at least some of the inserts are located eccentrically with respect to the cylindrical axis of the corresponding insert.

In a preferred embodiment, all of the bores have the same cross-sectional size and shape.

In a highly preferred embodiment, the frame is in the size and shape of a bowling ball.

Preferably, the finger blocks are pivoted to the frame about a common axis which extends through the center of the bowling ball shaped frame.

In one embodiment, the center of the bowling ball shaped frame and third bore define a medial plane and the first and second finger blocks are movable in respective planes on either side of the medial plane. The respective planes are parallel to the medial plane.

In a highly preferred embodiment, the location generating means comprises two potentiometers, one connected to each of the blocks.

In one embodiment of the invention, each of the potentiometers includes a rotatable wiper shaft and each of the blocks is pivoted to the frame and connected to the wiper shaft of the respective potentiometer.

Preferably, each block is pivoted to the frame for rotation about an axis and each potentiometer has its wiper shaft displaced to one side of the axis. Means, including a positive drive connection, extend between each wiper shaft and the associated block.

Preferably, the positive drive connection includes a timing belt.

In a preferred embodiment, there is provided a latch mechanism for each of the finger blocks for a latching the finger block in any of a plurality of positions on the frame.

Preferably, the latch normally latches the finger block in any one of a plurality of different positions relative to the respective finger hole and is a releasable latch. Means are provided for selectively disabling the latch to allow the finger block to be free to move between the positions without releasing the latch.

In one embodiment, the releasable lock comprises an actuate array of teeth centered on the pivot axis of the block and adjacent the finger block. A lever is mounted on the block for movement relative thereto and has at least one tooth that may be matingly received in the array. A spring is provided to bias the lever so that the tooth is received in array and the lever is movable against the bias of the spring to move the tooth out of array to release the latch.

In such an embodiment, the disabling means includes an actuator mounted on the lever and movable between an enabling position and a disabling position thereon. The actuator, when in the enabling position, allows the spring to move the lever and the tooth into the array, and when in the disabling position, limits movement of the lever and the tooth toward the array to prevent the tooth from entering the array.

Preferably, the finger block carries a first detent surface and the actuator carries a second detent surface which is moveable into and out of engagement with the first detent surface. The detent surfaces are engaged when the actuator is in the disabling position.

In one embodiment, the actuator is pivoted to the lever and the first detent surface overlies the lever.

According to another facet of the invention, an apparatus for drilling holes in a bowling ball is provided. It includes a table having an upper surface, a carriage, a boring tool mounted beneath the upper surface of the table, and means mounting the carriage and the bowling tool on the table for relative movement in two mutually transverse directions thereon. An upwardly opening ball receiving pocket is located on the carriage and is adapted to receive and support, under the influence of gravity, a ball above the upper surface and in a position to be intercepted by the boring tool. Means are provided for reciprocating the boring tool through the pocket and away from the pocket. An arm is mounted on the carriage and is in a position overlying the pocket. The arm includes a first ball gripping surface rotatable about a generally horizontal axis. A second ball gripping surface is located on the carriage and is rotatable about the horizontal axis. The ball gripping surfaces are on opposite sides of the pocket and means are provided for rotating at least one of the ball gripping surfaces about the horizontal axis. Means are provided for effecting relative movement of the ball gripping surfaces toward and away from each other along the generally horizontal axis.

The generally horizontal axis preferably lies slightly above a parallel, generally horizontal plane that is located to pass through the center of a ball when a ball is resting in the pocket so that when a ball is resting in the pocket and the ball gripping surfaces are moved toward each other, the ball will be lifted out of the pocket until its center is on the horizontal axis about which the ball gripping surfaces are rotatable.

Preferably, at least one of the ball gripping surfaces is a circular surface centered on the generally horizontal axis.

In a preferred embodiment, the arm is mounted to the carriage by a horizontal pivot. The axis of the pivot is generally transverse to the horizontal axis so that the arm may be pivoted between the position overlying the pocket and a second position allowing free access to the pocket.

In a preferred embodiment, the arm carries an indexing means so that a ball in the pocket may be properly located therein by aligning the mark on the ball with the indexing means.

Preferably, the indexing means comprises an aperture in the arm.

In a preferred embodiment, the aperture is vertically aligned with the mid-point of the pocket.

In a preferred embodiment, the means mounting the carriage and the boring tool for relative movement mount the carriage for movement on the table upper surface.

The invention also contemplates the provision of lock means for locking the carriage to the table during operation of the boring tool.

The invention further contemplates the provision of control means for the apparatus and in a preferred embodiment, includes input means for providing ball hole location information to the apparatus so that after a ball is located in the pocket, sequentially the ball will be gripped by the ball gripping surfaces, the ball will be indexed about the generally horizontal axis and relative movement between the pocket and the boring tool in the mutually transverse directions will be effected to locate the ball relative to the boring tool, and the boring tool reciprocated to intercept the pocket.

According to the invention, the input means includes a first finger block, a second finger block and a frame having a third bore as mentioned previously. Means mount the finger blocks in the frame in generally side by side relation for movement toward and away from the third bore and means are located in the frame and connected to the finger blocks for generating a single representative of the distance between each finger block and a third bore.

Preferably, the frame is configured in the size and shape of a bowling ball and a flexible electric cable connects the signal generating means to the control means of the apparatus so that the frame may be held by a bowler and "phantom" thrown to test the feel of a fitted ball.

Other objects and advantage will become apparent from the following specification taken in connection with the accompanying drawings.

DESCRIPTION OF THE DRAWINGS

FIGS. 18–24, inclusive, are flow diagrams illustrating programs run in the fitting or drilling apparatus.

DESCRIPTION OF THE PREFERRED EMBODIMENT

Figure 1:
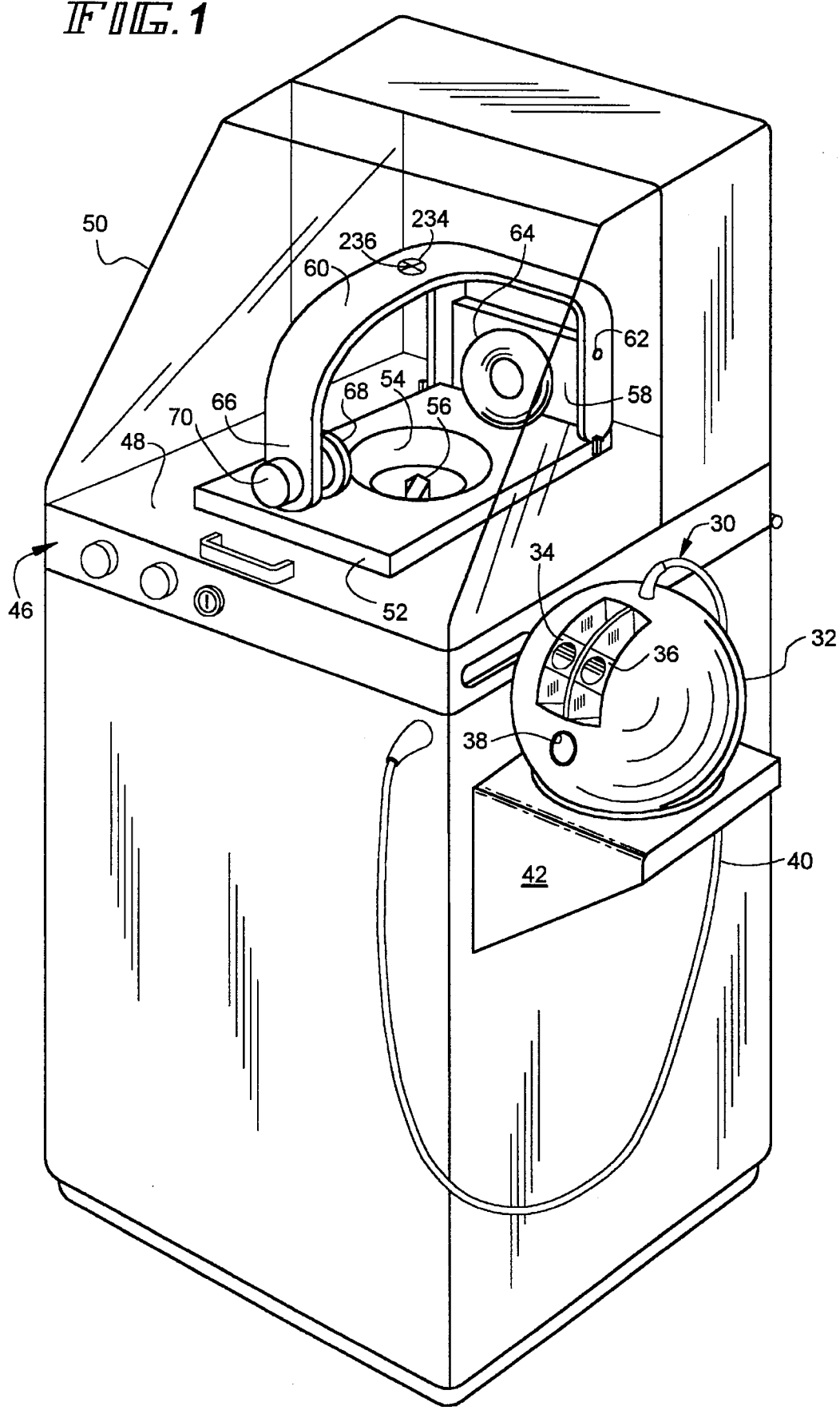
FIG. 1 is a perspective view of an apparatus for fitting a bowling ball to the hand of a user and an apparatus for drilling a bowling ball combined with one another according to the invention.

Referring to FIG. 1, a combined fitting and drilling apparatus is illustrated and will be described. However, it is to be particularly noted that the drilling apparatus is usable without specific fitting apparatus and vice versa. It is, nonetheless, a preferred embodiment of the invention that the two be combined together as to be described herein.

More particularly, the fitting apparatus is generally designated 30 and includes a frame 32 in the size, shape and approximate weight of a bowling ball. The fitting apparatus includes a first movable finger block 34 and a second movable finger block 36 in side by side relation. Also included is a stationary, thumb aperture 38. The finger blocks 34 and 36 are movable toward and away from the thumb hole 38 independently of one another, and as will be seen, may be latched in any desired position within their ranges of movement. Through the use of inserts received in bores in the finger blocks 34 and 36, as well as the thumb hole 38, electrical signals representing information to be used in drilling the ball are generated and may be outputted on a flexible, electrical cable 40.

As illustrated, the fitting apparatus 30 rests under the influence of gravity on a shelf 42 which in turn is on the side of a cabinet 44 housing the drilling machine. By reason of the use of a flexible cord 40, and because of the shaping and weighting of the fitting apparatus 30 as a bowling ball, a person may set the finger blocks 34 and 36 in a desired position of adjustment and then "phantom" throw the ball to determine the "feel" of the particular adjustment selected. Naturally, of course, the person will not release the apparatus but merely swing the same, thus, a "phantom" throw. If, upon the conclusion of one or more phantom throws, the positioning of the finger blocks 34 and 36 relative to the thumb hole 38 is suited to the bowler's desires, a drilling operation may be commenced using information provided from the fitting apparatus 30 by the electrical cable 40.

The drilling apparatus is generally designated 46 and includes a table surface 48 on the upper side of the cabinet 44. A transparent hood 50 may be pivoted on the cabinet 44 in any suitable fashion between open and close positions. The carriage 52 is mounted on the upper surface of the table 48 for movement thereon in two mutually perpendicular directions.

The carriage 52 includes an upwardly opening, ball receiving pocket 54. The lower part of the pocket 54 is open and a boring tool in the form of a drill bit 56 or the like moves through the pocket 54 to engage a bowling ball gripped by the apparatus after being initially deposited in the pocket 54.

One end of the carriage 52 includes a vertical plate 58 which pivots an arm 60 for rotation about a generally horizontal axis defined by a pivot pin 62. A horizontally opening, concave, circular ball gripping surface 64 is mounted on the plate 58 and is on a side of the pocket 54 diametrically opposite from an remote end 66 of the arm 60. The remote end 66 also mounts a horizontally opening concave, circular ball gripping surface 68. Both of the ball gripping surfaces 64 and 68 are rotatable about a common horizontal axis transverse to the axis defined by the pivot pin 62 and the gripping surface 64 is provided with a motor for rotating the same.

The ball gripping surface 68 is mounted on the rod end of a short stroke electromechanical 70 for movement toward and away to the surface 64. Initially, the surfaces 64 and 68 will be spaced sufficiently from one another that a ball may be deposited in the pocket 54. Upon actuation of cylinder 70, the surface 68 moves toward the surface 64 to grip the ball and simultaneously lift the same out of contact with the surface of the pocket 54. To this end, the axis of rotation of the surfaces 64 and 68 is disposed slightly above a horizontal plane encompassing the center of a conventional bowling ball when the bowling ball is resting in the pocket 54. Thus, when such a ball is engaged by the surfaces 64 and 68 and "pinched" in between, it is literally lifted out of the pocket 54 so that it's center is moved to be on the horizontal axis of rotation of the surfaces 64 and 68. As will be seen, this enables the ball to be indexed relative to the boring tool 56 out of contact with the surface 54 to avoid any possibility that part of the surface 54 could mar the exterior surface of the ball as it is being indexed.

Figure 2:
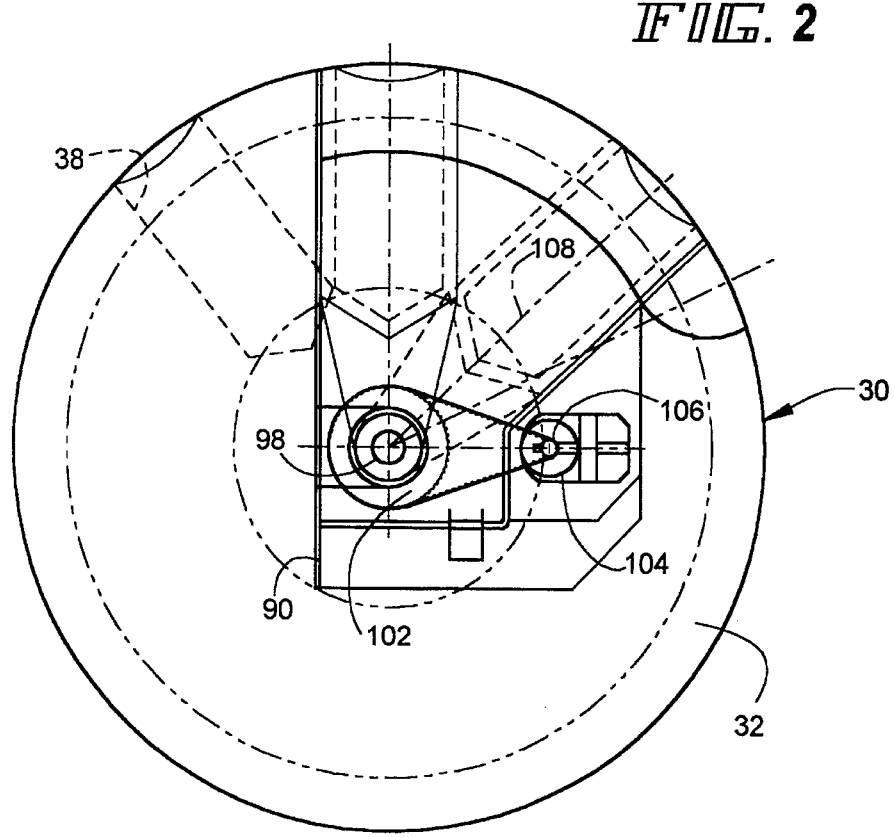
FIG. 2 is a sectional view of the fitting apparatus.
Figure 3:
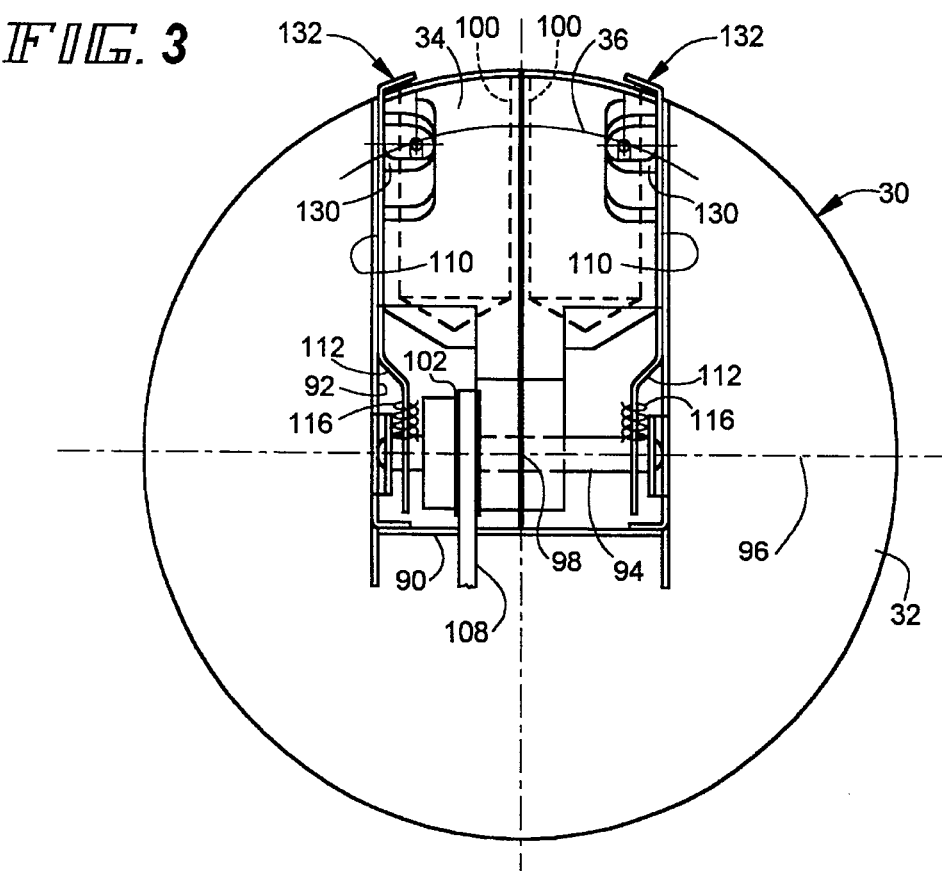
FIG. 3 is a sectional view of the fitting apparatus taken at right angles to FIG. 2.

Turning now to FIGS. 2 and 3, the fitting apparatus will be described in greater detail. As seen in those figures, a small metallic housing 90 is received in an enlarged recess 92 in the frame 32. In practice, the frame 32 may be a conventional bowling ball with the recess 92 formed therein along with the thumb hole 38.

The housing 90 mounts a pivot shaft 94 defining a pivot axis 96 which passes through the center 98 of the frame 32.

The finger blocks 34 and 36 have the configuration illustrated and each includes an interior bore 100 opening to an end of the block 34 or 36 opposite from the shaft 94. The bores 100 have the same diameter as the bore 38 in a preferred embodiment.

The opposite end of each of the blocks 34 and 36 is loosely pivoted on the shaft 94 so as to be pivoted for movement between the solid and dotted line positions illustrated in FIG. 2, that is, in directions toward and away from the thumb hole 38.

Concentric with the pivot shaft 94, each of the blocks mounts a toothed wheel 102 which moves with the associated finger block. Only one of the wheels is illustrated in FIGS. 2 and 3. Elsewhere on the housing 90, two potentiometers 104 are mounted. Each of the potentiometers 104 includes a wiper shaft 106 which is rotatable and which is toothed as well. A toothed timing belt 108 is reeved about each wheel 102 and each wiper shaft 106. As a consequence, whenever the associated finger block 34 or 36 is rotated between the positions illustrated in FIG. 2, the wiper shaft 106 of the potentiometer 104 associated therewith will also be moved. Thus, the resistance of one side or the other of the potentiometer to the wiper thereof is varied and it's magnitude is representative of the position of the associated block 34 or 36 in relation to the thumb hole 38.

Figure 4:
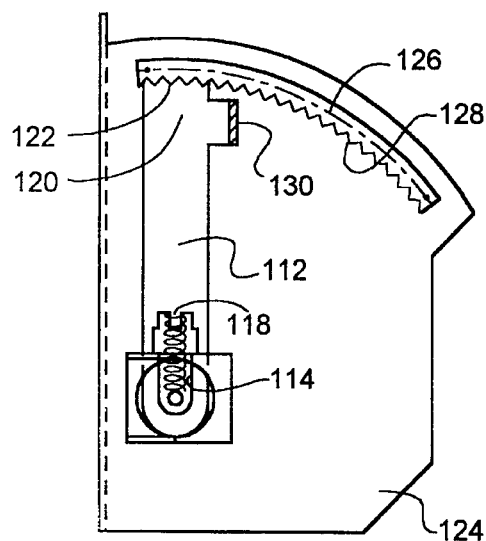
FIG. 4 illustrates part of a latch mechanism used with the fitting apparatus.
Figure 5:
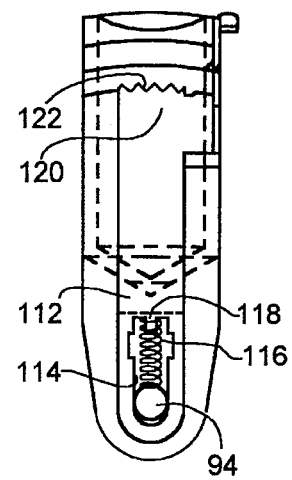
FIG. 5 illustrates application of the latch apparatus to a finger block.

Also seen in FIG. 3 is part of a latch mechanism whereby each of the blocks 34 and 36 may be latched in any selected position within their range of movement. Specifically, both of the blocks 34, 36, on one side thereof, include a groove 110 (See also, FIGS. 6 and 7). Slidable within each groove 110 is a slide or lever 112. As can be seen in FIGS. 4 and 5, the slide 112 includes elongated opening 114 which receives the pivot shaft 94. A spring 116 is interposed between the pivot shaft 94 and retained in place by a tongue 118 at one end of the slot 114. The spring 116 is a compression coil spring and as a consequence, will bias the associated slide 112 a radial direction away from the pivot shaft 94 and the center 98 of the ball shaped frame 32.

As seen in FIGS. 4 and 5, near it's radially outer end 120, the slide 112 includes a plurality of teeth 122. The adjacent side 124 of the housing 90 includes an arcuate plate 126 having inwardly directed, complementary teeth 128. Thus, when the teeth 122 are within the arcuate array of teeth 128, the slide 112 cannot be pivoted about an axis of the pivot shaft 94. And because the slide 112 is in a groove 110 within the corresponding one of the blocks 34 or 36, the block 34 or 36 is likewise locked in position.

Figure 6:
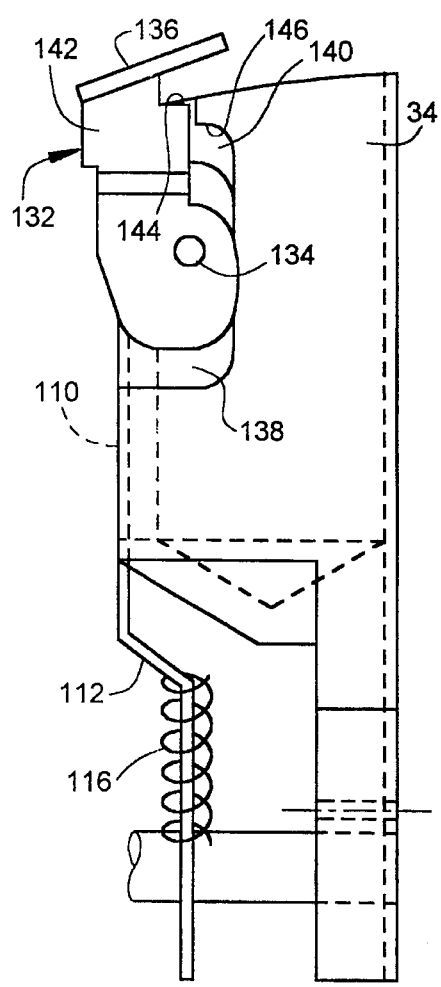
FIG. 6 is a view taken at right angles to FIG. 5 and illustrates the configuration of the latch components when the latch is engaged.
Figure 7:
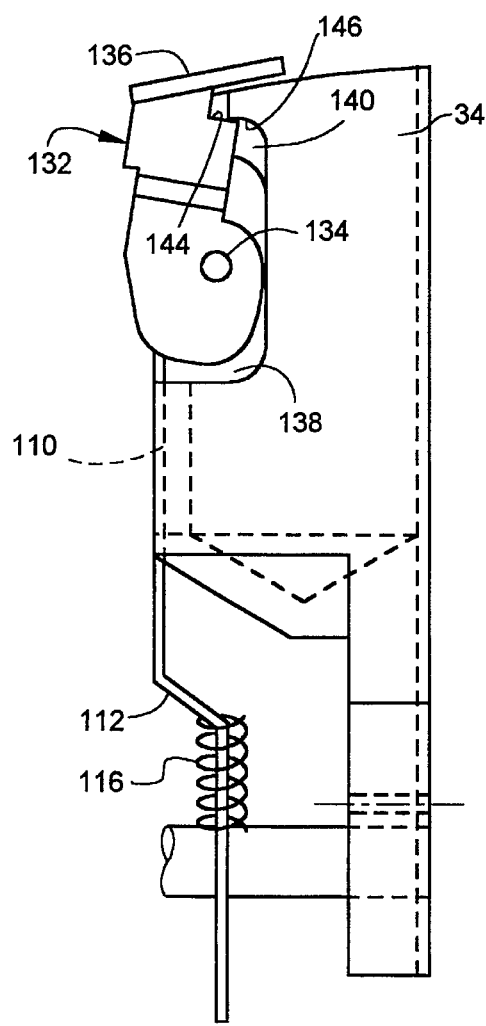
FIG. 7 is a view similar to FIG. 6 but illustrating the configuration of the components when the latch is disabled.

To disable the latch mechanism, it is necessary to move the slide 112 radially inwardly so as to move the teeth 122 inwardly of the teeth 128. To this end, at their radially outer end 120, each of the slides 112 includes a tab 130 which is bent at right angles to the body of the slide 112. A latch actuator, generally designated 132, is pivoted to the tab 130 by a pivot pin 134 (FIGS. 6 and 7).

The radially outer end of each actuator 132 includes an operator surface 136 in the form of a tab that is generally tangential to the surface of the ball shaped frame 32.

One side of each block 34 adjacent the groove 110 includes a stepped recess including a deep step 138 and a somewhat shallower step 140. The tab 130 is movable within the deep step 138 while a part 142 of the actuator 130 just below the operator surface 136 movable within the shallower recess 140.

Also just below the operator surface 136, the actuator 132 includes a detent surface 144 which faces generally radially outwardly. At the same time, a generally radially inwardly facing detent surface 146 is located on the block itself at the radially outer edge of the shallow recess 140.

Under normal circumstances, the latch mechanism is enabled and the components will have the configuration illustrated in FIG. 6. In this situation, the teeth 122 on the slide 112 will be engaged with the teeth 128 on a housing side 124 and the associated block 34 or 36 will be locked against movement. If, however, it is desired to pivot the associated block about the pivot pin 94, one need only move the operator surface 136 radially inwardly to move the slide 112 radially inwardly against the bias of the spring 116. This will cause the teeth 122 to move radially inwardly and out of engagement with the teeth 128 to allow the block 34 or 36 to be pivoted.

If, however, it is desired to completely disable the latch, in addition to moving the operator surface radially inwardly as just described, the actuator 132 may be pivoted about the axis of the pin 134 by application of appropriate force against the operator surface 136. This brings the detent surface 144 into the recess 140 and into interference relation with the detent surface 146 as illustrated in FIG. 7. The bias of the spring 116 will maintain the components engaged in the position illustrated, but in the meantime, the teeth 122 have been moved out of engagement with the teeth 128 and will be held radially inwardly of the point of engagement therewith by the interference between the detent surfaces 144 and 146. Thus, the latch system is effectively disabled, and the blocks are freely movable about the pivot pin 94 in this circumstance.

As will be described in greater detail hereinafter, inserts having finger holes of varying diameters may be located within the bores 100 and the thumb hole 38 by a purchaser of a bowling ball and the inserts may be interchanged so the desired finger hole or thumb hole diameter is determined.

Also as will be described, the inserts are cylindrical and have the finger holes, at least in some cases, eccentrically located with respect to the cylindrical axis of the insert. Thus, by changing the position of rotation of an insert within one of the bores 100 or the thumb hole 38, variables such as the bridge tension can be changed. In any event, once the inserts have been selected for the proper finger hole diameter and properly oriented to suit the bowler within the respective bores 100 or the thumb hole 38, and the blocks 34, 36 locked in place through use of the latching system, electrical signals from the potentiometers 104 may be taken and employed in a subsequent ball drilling operation.

Figure 8:
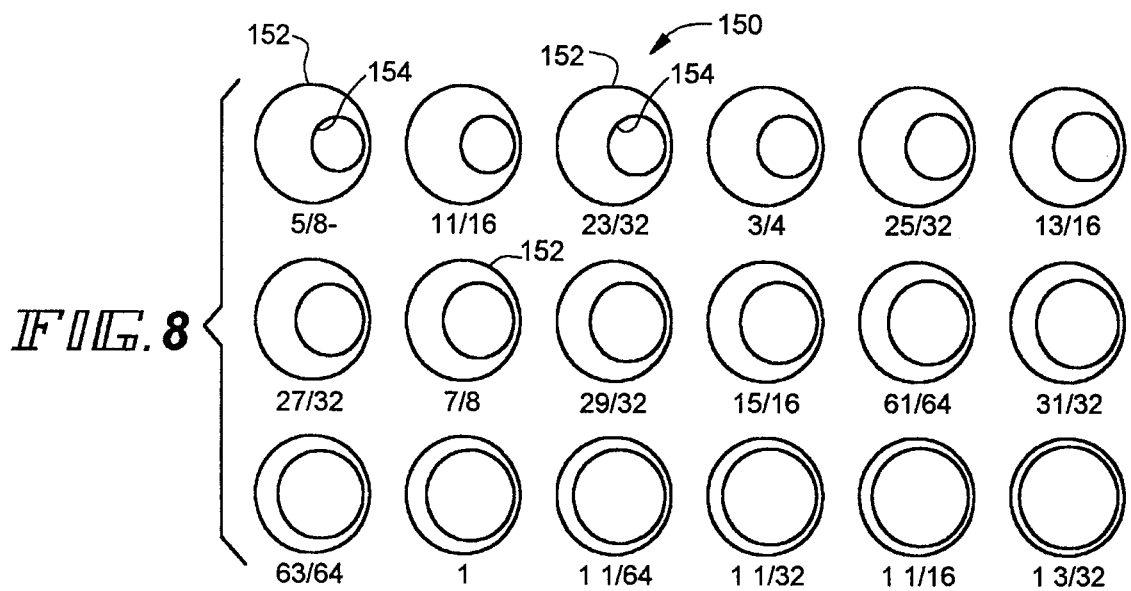
FIG. 8 is a plan view of a group of inserts used for sizing finger holes.

Turning now to FIGS. 8–11, the inserts just alluded to will be described in greater detail. Specifically, FIG. 8 illustrates a group of eighteen finger hole inserts, generally designated 150. Each insert within the group 150 is generally cylindrical, having a cylindrical outer surface 152. In addition, each insert includes a bore 154 whose axis is parallel to a cylindrical axis of the cylindrical surface 152. The bores 154 have the diameters illustrated in FIG. 8 which are in inches.

Figure 10:
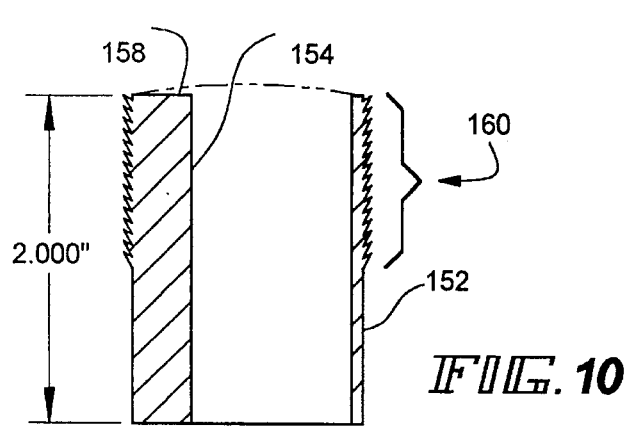
FIG. 10 is a sectional view of a typical insert.

An important feature of the invention is that the axis of the bores 154 is offset, but parallel to the axis of the cylindrical surface 152 of each of the inserts. Generally speaking, and as illustrated in FIG. 10, each bore 154 will be located sufficiently close to the cylindrical surface 152 such that a minimum wall thickness of about 0,062" or less exists. The inserts will have a cylindrical surface 152 that is 2" in length and which has a diameter of 1,125".

Because of the eccentricity of the bores 154 with respect to the cylindrical surfaces 152, both span and bridge can be varied simply by selecting the angular position of the insert as it is inserted into a bore drilled in a bowling ball. Of course, the angular position of each insert with respect to its bore should first be determined by appropriately locating the insert within a corresponding finger hole in the fitting apparatus 30.

One end 156 of each insert in the group 150 is relatively planar and is the inner end, that is, that end that is to be located within the ball. The opposite end 158 has a surface that is a portion of a sphere with a radius of curvature corresponding to that of the radius of the bowling ball with which the insert is to be used.

Figure 11:
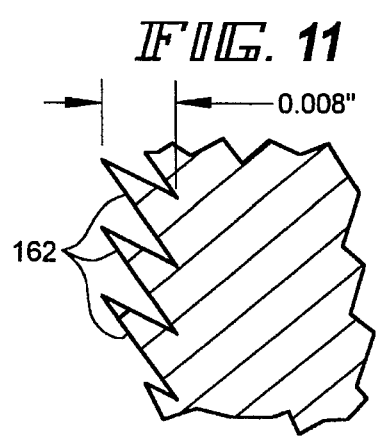
FIG. 11 is an enlarged, fragmentary section of an insert.

Each insert's cylindrical surface 152, adjacent the end 158, may be provided with a fish hook or bayonet area, generally designated 160. The area 160 extends about the periphery of the insert and as illustrated in FIG. 11, includes a plurality of annular, pointed ridges 162. The ridges 162 are angled so as to point toward the end 158 of the insert. Generally speaking, the ridges 162 will extend from the cylindrical surface 152 in a distance measured in the direction transverse to the cylindrical axis of the insert on the order of about 0,008".

As a consequence of this construction, the insert maybe inserted into a hole drilled in a bowling ball and will be mechanically held in place by the interference between the ridges 162 and the material of the core of the bowling ball. Because of the angling of the ridges 162 in the direction of the end 158, insertion of the insert is facilitated because the ridges 162 tend to collapse during insertion. Conversely, when one attempts to remove the insert, an increasing interference fit is encountered because the ridges 162 tend to flare outwardly into the material of the ball.

In some instances, it may be desired to supplement the ridges 162 with an adhesive applied to the cylindrical surface 152 of the insert.

Figure 9:
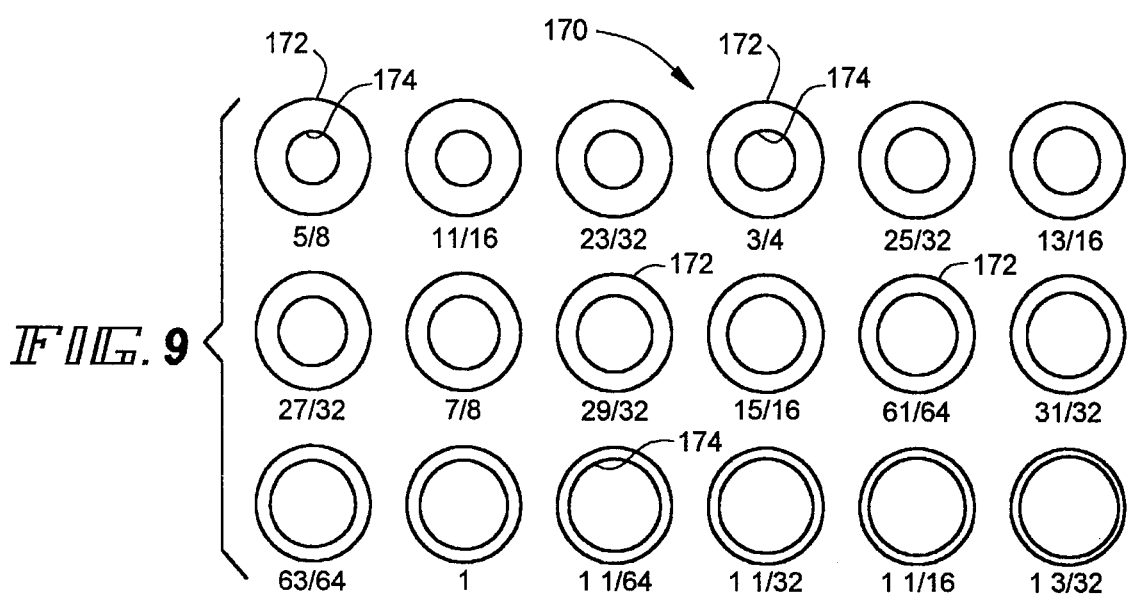
FIG. 9 is a plan view of a group of inserts used for sizing thumb holes.

FIG. 9 illustrates a group 170 of thumb hole inserts. The inserts of the group 170 include cylindrical surfaces 172 which have a diameter of 1,125". The inserts of the group 170 also have a length of 2,000", a spherical end like the end 158, and the ridges 162.

In the case of the inserts of the group 170, the same are provided with thumb hole bores 174. The bores 174 have the diameters indicated in FIG. 9 which are in inches. The axis of each of the bores 174 falls exactly on the axis of the cylindrical surface 172 of the corresponding insert.

Because the bores 174 are centrally located in each of the inserts within the group 170, the angular location of each insert within the hole in which it is received either in the fitting apparatus 30 or ultimately in a bowling ball is immaterial.

Figure 12:
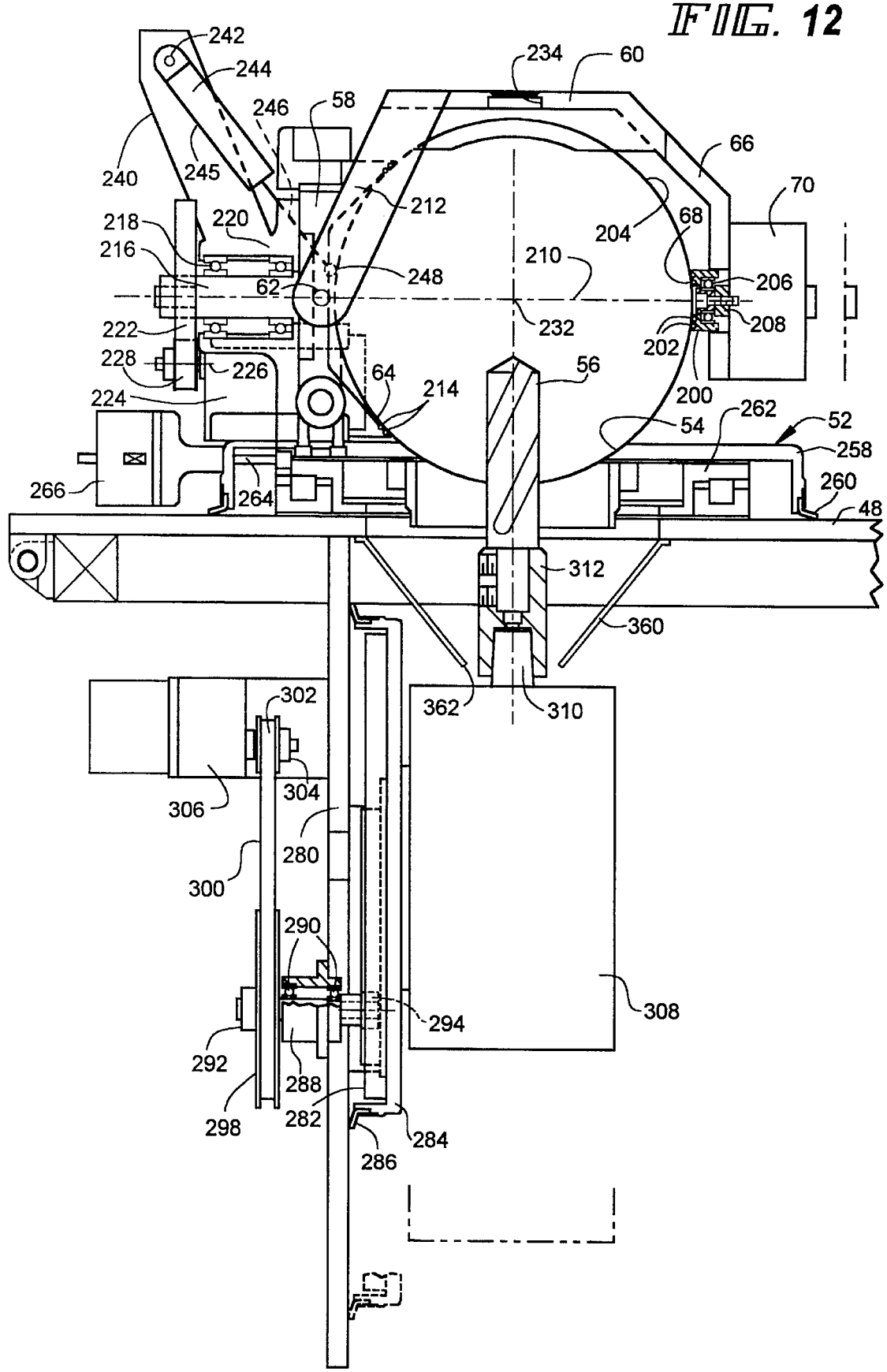
FIG. 12 is an elevation of the ball drilling apparatus with parts shown in section.
Figure 13:
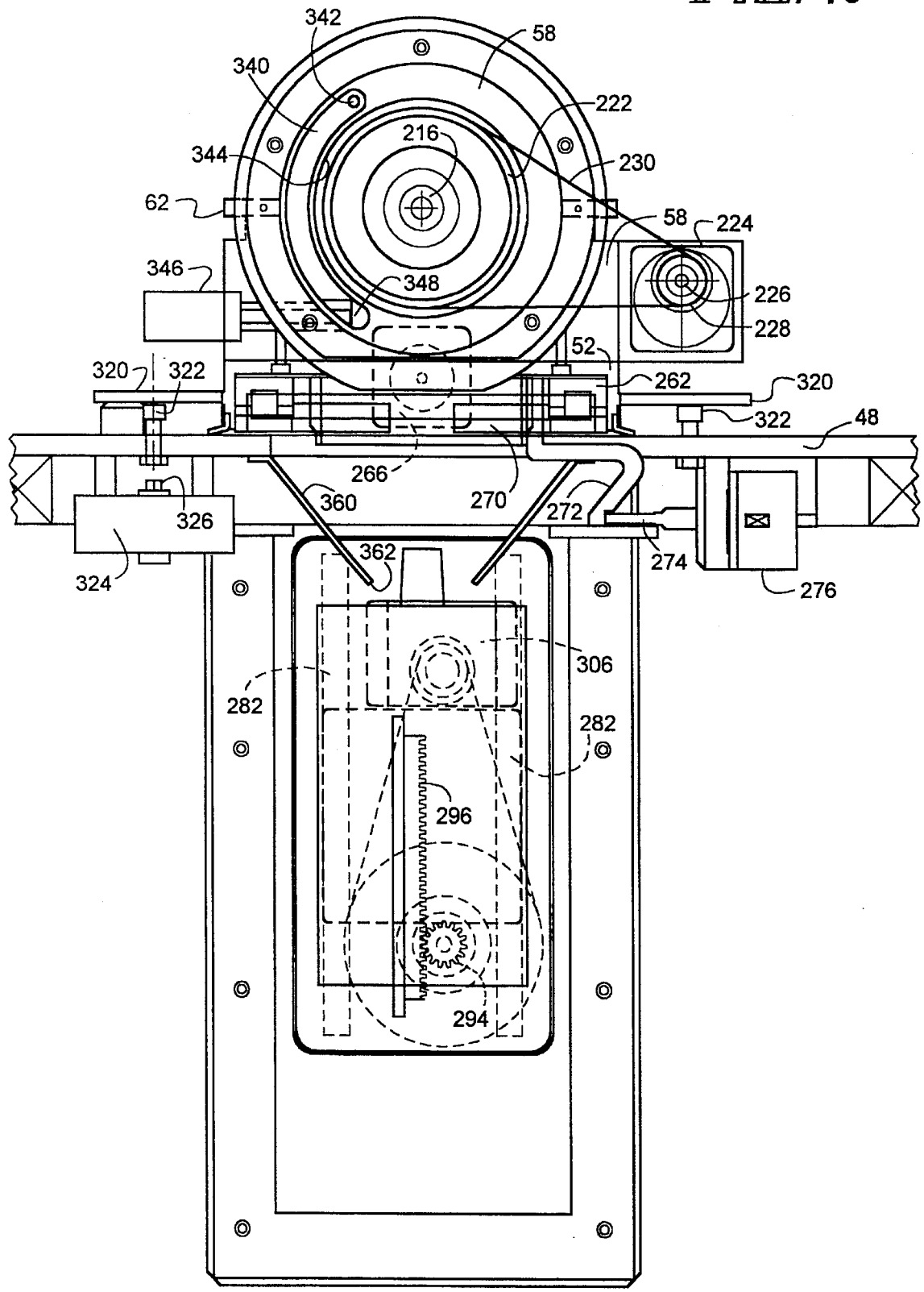
FIG. 13 is an elevation taken at right angles to the view of FIG. 12.
Figure 14:
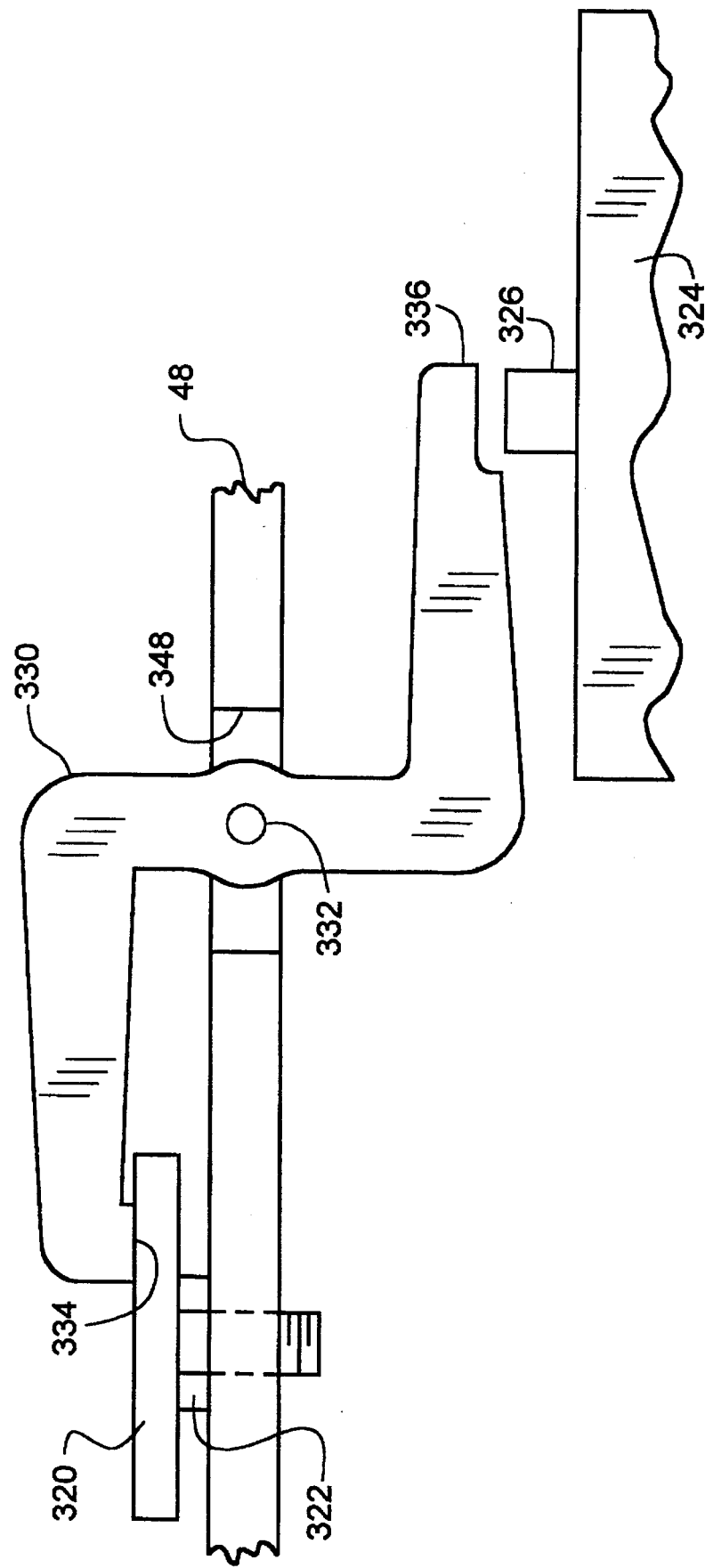
FIG. 14 is a fragmentary, enlarged elevation illustrating a locking mechanism used in the ball drilling apparatus.

Turning now to FIGS. 12–14, inclusive, the ball drilling machine 46 will be described in greater detail. Referring specifically to FIG. 12, the ball gripping surface 68 is seen to include a shallow cup like fixture 200. The surface thereof facing the pocket 54 mounts elastomeric rings 202 for engaging the periphery of a bowling ball 204. Oppositely thereof, a bearing 206 mounts the fixture 200 on the rod end 208 of the electromechanical cylinder 70 for rotation about a horizontal axis shown at 210 as mentioned previously.

Oppositely thereof, a shallow cup shaped fixture 212 which opens toward the surface 68 defines the surface 64. It includes a pair of rubber like rings 214 which serve same purpose as the rings 204.

The fixture 212 is mounted on a stub shaft 216 which is journalled by spaced bearings 218 and 220 to the plate 58. On the end of the stub shaft 216 remote from the fixture 212, a toothed wheel 222 is located. As best seen in FIG. 13, a stepper motor 224 is mounted on side of the plate 58 and includes a rotary output shaft 226 mounting a toothed wheel 228. A timing belt 230 is reeved about the toothed wheels 222 and 228 so that when the stepper motor 224 is energized, the stub shaft 216, and thus the fixture 212, be rotated. In this regard, the rotational axis of the stub shaft 216 is the axis 210.

As seen in both FIGS. 1 and 8, the arm 60, at a location vertically aligned above a point 232 (FIG. 8) which corresponds to the location of the center of the ball 204 when gripped by the gripping surfaces 64 and 68 includes an alignment or indexing aperture 234. As seen in FIG. 1, cross hairs 236 are centered within the aperture 234.

The purpose of this structure is to allow the ball 204 to be properly aligned within the apparatus prior to the initiation of a drilling operation.

In this regard, manufacturers of bowling balls conventionally mark each ball with a "center spot". Finger holes are intended to be drilled about the center spot and centered with respect thereto.

By raising the arm 60 about the pivot 62, a ball may be deposited on the surface 54. The arm 60 may then be lowered and the ball 204 manipulated to be aligned the center spot with the cross hairs 236.

In this regard, an arm 240 is mounted to the plate 58. The arm 240 mounts a pivot 242 for the cylinder end 244 of a biasing strut 245. The rod end 246 is pivotally connected as at 248 to the arm 60 at a point closely adjacent to the pivot pin 62. As a result, an overcenter arrangement is arrived at whereby the strut 245 biases the arm 60 to the operative position illustrated in FIG. 12 or biases it to a raised position (not shown) whereat free access to the pocket 54 is achievable.

The carriage 52 is in the form of an inverted pan like element 258 and includes a peripheral, elastomeric lip 260 which engages the upper surface of the table 48. The purpose of the lip 280 is to prevent debris from entering the space underneath the table.

The carriage 52 includes a first carrier 262 to which a screw shaft 264 (FIG. 12) stationarily mounted. The carrier 262 is mounted on linear bearings for movement along a first axis. The screw shaft 264 extends into a conventional stepper motor 266 which is mounted to the pan 258 and which includes an internal nut threaded on the screw shaft 264. When the stepper motor 266 is energized, the nut is rotated which causes the screw shaft 264 to be moved into or pushed out of the stepper motor 266, thereby effecting relative motion between the pan 258 and the carrier 262. Inasmuch as the pocket 54 is formed in the element 258, it will be appreciated that operation of the stepper motor 266 provides for indexing of the carriage 52 on the first axis.

As best seen in FIG. 13, a second carrier 270 is also provided. The carrier 270 is mounted for movement on the table 48 by linear bearings of a conventional construction in a direction that is transverse to the direction of movement afforded by operation of the stepper motor 266. An S-shaped bracket 268 secured to the second carrier 270. Below the table 48, a bracket 272 stationarily mounts a screw shaft 274 which in turn extends into a stepper motor 276 which in all respects is identical to the stepper motor 266. The stepper motor 276 is secured to the underside of the table 48 and when actuated, its internal nut will advance or retract the screw shaft 274 thereby moving the carrier 270 along a second axis. That in turn carries the first carrier 262 along the second axis but the latter may also be moved on the mutually perpendicular first axis through action of the stepper motor 66 to move the carriage 52 along the first axis as well. Thus, the carriage 52 is mounted for motion along two mutually perpendicular axes to thereby position a bowling ball 204 held by the ball gripping surfaces 64 and 68 at a desired location on the table 48.

The table 48, at its underside, also mounts a vertically directed, depending plate 280. The plate 280 mounts a pair of linear bearings 282 which in turn mount a carriage 284 for vertical movement below the table 48. The carriage 284 also carries a peripheral elastomeric lip 286 for purposes of preventing the entry of debris into the bearing system.

The plate 280 also mounts a sleeve 288.

The sleeve 288 mounts bearings 290 which journal a shaft 292. One end of the shaft 292 mounts a pinion gear 294 which is engaged with a rack 296 which is mounted to the carriage 284. As a consequence, it will be appreciated that when the shaft 292 is rotated, the rotation will be converted to linear motion by the rack and pinion defined by the rack 296 and pinion gear 294 and will reciprocate carriage 284 in a vertical direction depending upon the direction of rotation applied to the shaft 292.

Rotation of the shaft 292 is accomplished via a toothed wheel 298 having a toothed timing belt 300 reeved about it as well as a toothed wheel 302 on the output shaft 304 of a stepping motor 306 mounted on the plate 280. Thus, the stepping motor 306 may be operated to advance the carriage 284 toward or away from the table 48.

On the side of the carriage 284 opposite from plate 280, the carriage 284 mounts a direct current motor 308. The motor 308 has an output shaft 310 mounting a chuck 312 which in turn mounts the boring tool 56. Energization of the DC motor 308 cause rotation of the boring tool 56. Boring of a ball 204 may then be accomplished by driving the carriage 284 upwardly through operation of the stepper motor 306.

Of course, prior to that occurring, the ball 204 will be properly located in relation to the boring tool 56 movement the carriage 54 along two axes and rotation of the ball 204 about the axis 210.

To stabilize the carriage 252 during a boring operation, means are providing for locking the same in place. As best seen in FIG. 13, a pair of wings 320 extend from opposite sides of the carriage 52. Stops 322 in the form of bolts or the like are located to project upwardly from the table 48 so as to be in almost contacting relation with the undersides of each of the wings 320.

At two locations (only one of which is shown) the underside of the table 48 mounts short stroke electromechanical operators 24 having actuators 326.

As seen in FIG. 14, at corresponding locations, the table 48 includes apertures 328 which receive respective S-shaped levers 330. Each lever 330 is pivoted to the table by a pivot pin 332 and includes a brake surface 334 that can be used to clamp the associated wing 320 against underlying stop 322. The opposite end of the lever 330 is shown at 336 and overlies the actuator 326. Thus, when the short stroke cylinder 324 is actuated, the actuator 326 will advance against the end 336 of the lever 330 pivoting the same in a counter-clockwise direction as viewed in FIG. 10 to clamp the associated one of the wings 320, and thus lock the carriage in place for a boring operation.

It is also desirable clamp or lock the ball gripping surfaces 64 and 68 against movement during such an operation. Accordingly, an arcuate brake shoe 340 is pivoted as at 342 to the plate 58. The brake shoe 340 has a brake surface 344 which may engage the peripheral surface of the fixture 212 defining the ball gripping surface 64. An electromechanical solenoid 346 is pivotally connected to brake shoe 340 at an end 348 opposite from the pivot 342. Consequently, when the armature of the solenoid 346 is extended, brake surface 344 will engage the periphery to the fixture 212 to halt any rotation thereof that is occurring and prevent further rotation from occurring.

The table 48 also mounts a frusto conical deflector 360. The frusto conical deflector 360 is inverted and includes a central opening 362 at its minor base which is centered on the center location of the carriage 52. The purpose of the deflector 60 is to confine debris from the boring operation. Desirably, a vacuum source may be connected to the deflector 360 and withdraw all debris directed thereto.

Figure 15:
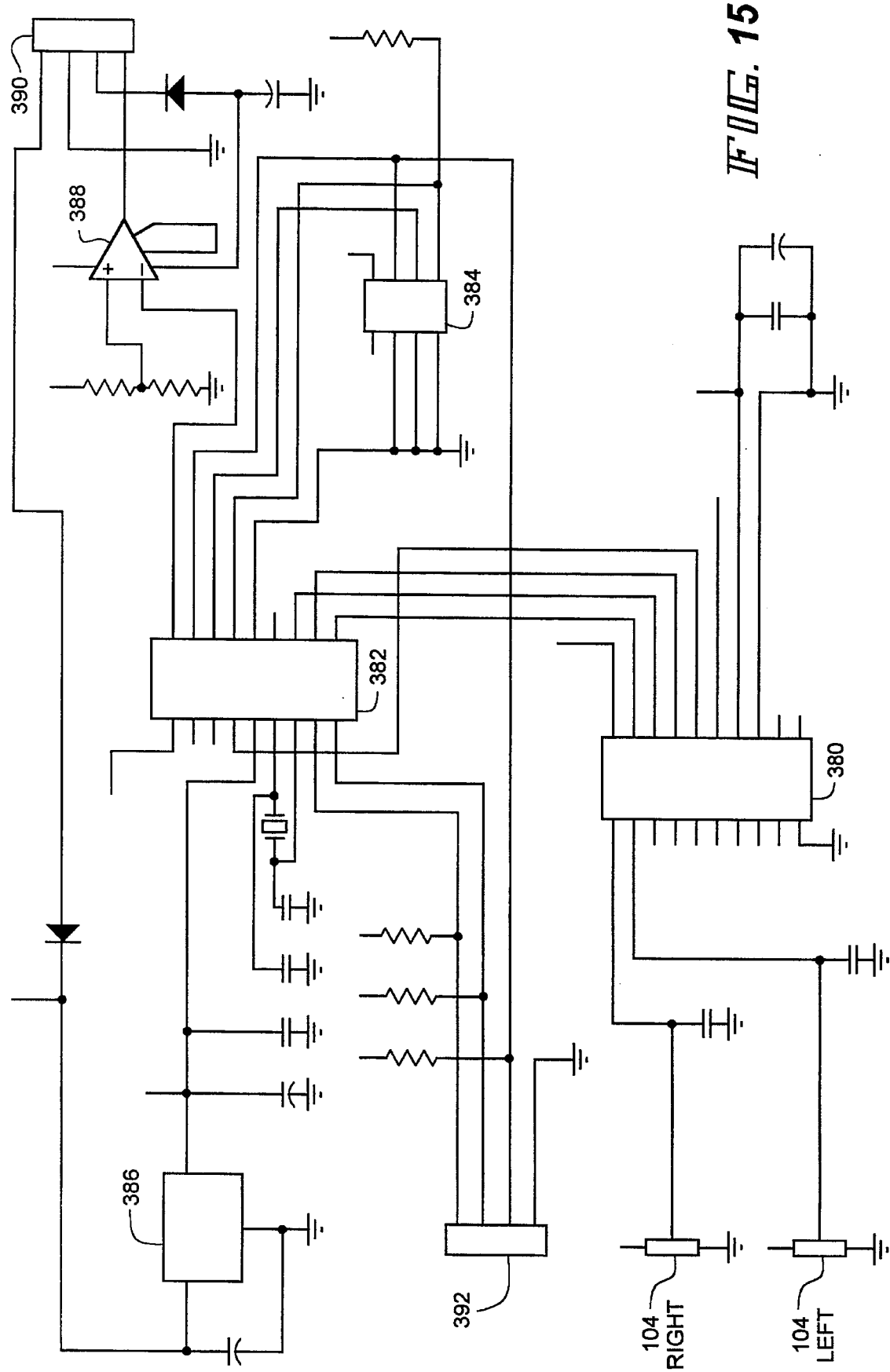
FIG. 15 is a block diagram of an electronic control system employed in the invention.

FIG. 15 illustrates in schematic form, an electronic control module that is contained within the fitting apparatus 30.

The potentiometers 104, one for the right finger hole and one for the left finger hole, are connected to a conventional analog to digital converter 380. It, in turn, is connected to a microprocessor or central processing unit 382 of conventional construction and having two internal clocks. A nonvolatile memory 384 is also connected to the microprocessor 382 as is a voltage regulator 386 of conventional construction.

For output purposes, a conventional RS232 line driver 388 is connected to a jack 390 which serves as a signal interface for the control of the drilling apparatus 46 to be described in greater detail hereinafter.

Also included is a calibration jack 392 having four pins and connected to serve as digital sequency inputs.

The jack or plug 392 is utilized only during the manufacturing or repair of the apparatus and is connected to a signal generator on those occasions. The signal generator may be a sophisticated piece of equipment that is highly automated or may be something as simple as three manually operated switches connected to respective low voltage dividers.

Figure 16:
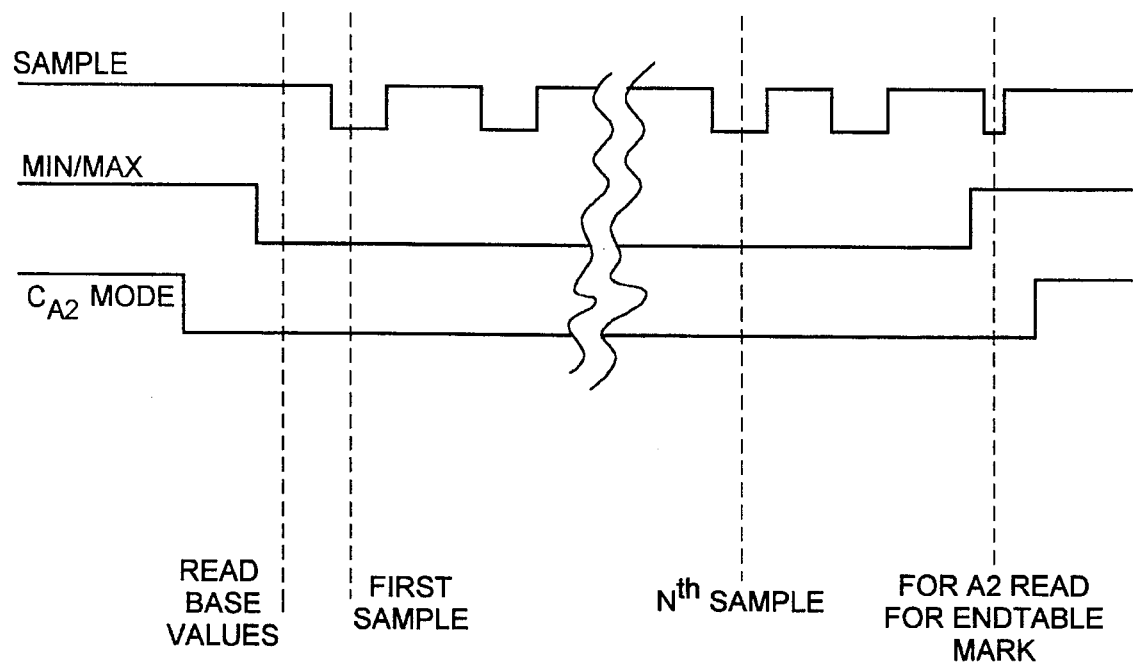
FIG. 16 illustrates waveforms used in calibrating the fitting apparatus.

Pin 1 of the jack 392 is connected to the signal generator so as to receive a SAMPLE signal such as illustrated in FIG. 16 while pin 2 may be connected to receive a MIN/MAX signal having the form illustrated in FIG. 16. Pin 3 can be connected to receive a CAL MODE signal as illustrated in FIG. 16 while pin 4 is connected to the system ground.

The signal generator is operated to generate a low CAL MODE signal whenever calibration is to occur. Similarly, the signal generator generates a low MIN/MAX signal from the beginning of the sampling process to the end thereof. The signal generator generates a low going SAMPLE signal whenever a particular reading is to be sampled. These signals may all be issued manually by the previously mentioned switches, if desired.

These components are employed to enable the system to be programmed for use with inexpensive potentiometers as the potentiometers 104. As is well known, the linearity of inexpensive potentiometers varies in unpredictable ways. Through the use of the hardware described and the software to be described, each incremental position of each of the finger blocks 34 and 36, over increments of movement such as 1/32 or 1/64 of an inch can be read and stored in a non-volatile memory 384 when the apparatus is manufactured or after it has been repaired. This information is then utilized to correct inaccuracies in the low cost potentiometers 104 thereby producing an accurate result for controlling the positioning of the various components of the drilling apparatus as will be seen.

Figure 17:
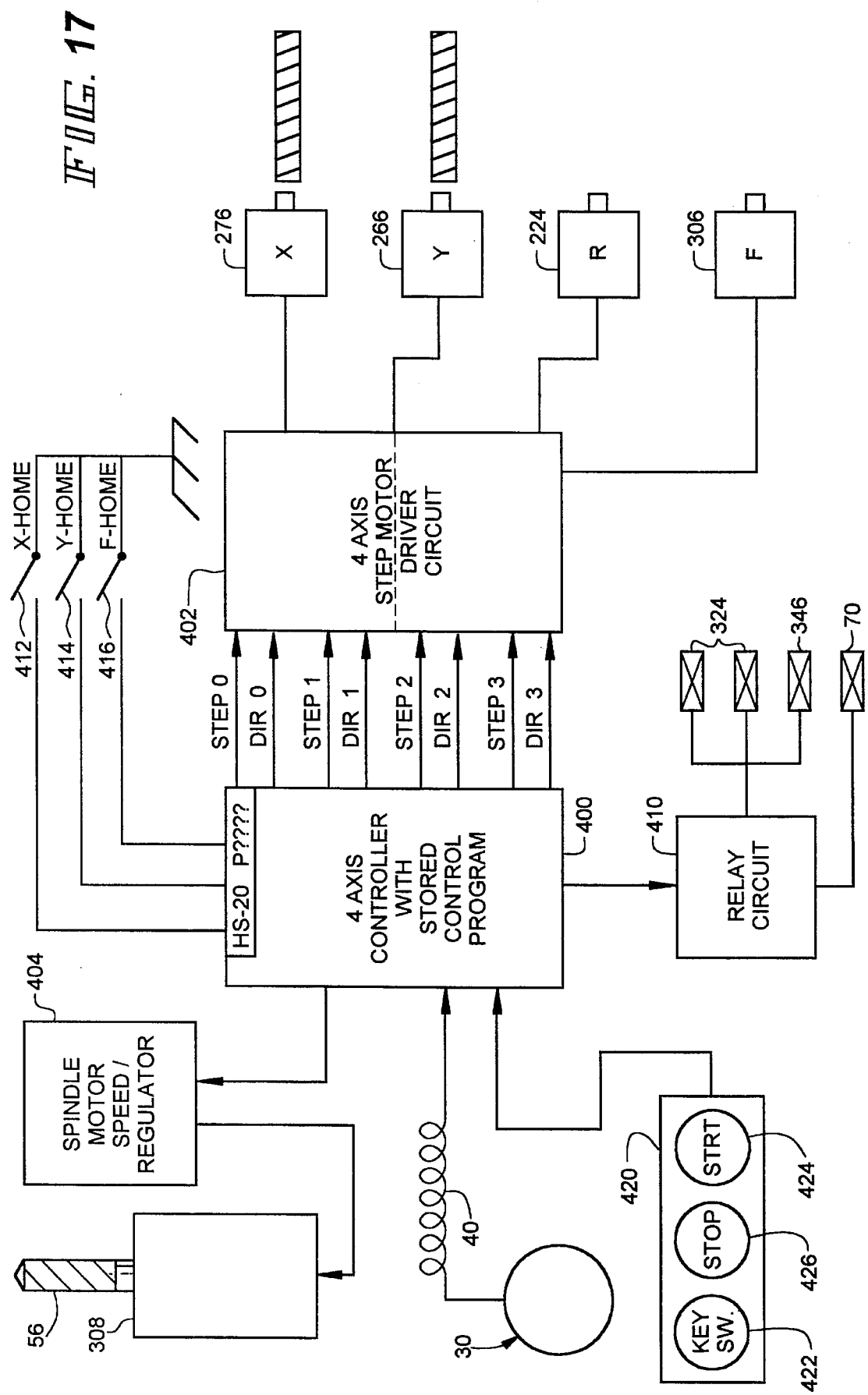
FIG. 17 is a block diagram of a control for the drilling apparatus.

Turning now to FIG. 17, a block diagram of the control for the drilling apparatus is illustrated. The fitting apparatus is shown at 30 with the connecting cord 40, via the jack 390 (FIG. 15), connected to a four axis controller 400 with a stored control program. The four axis controller is a type HS-20 available from CyberPak Co of Lemont, Ill. It is to be particularly noted that the four axis controller 400 will provide an approximate 12 volt signal at its connection to the jack 390. Because the control circuit shown in FIG. 15 for the fitting apparatus 30 has very low power requirements, it may be operated via an internal power supply within the four axis controller 400.

The four axis controller provides step signals and direction signals to a four axis step motor driver circuit 402. The circuit 402 may be four separate conventional step motor driver circuits, one for each of the stepping motors 224, 266, 276 and 306. Thus, according to a program to be described, and stored within the controller 400, the position of the carriage 52 for the ball to be drilled may be controlled. In particular, the controller 400, via the driver 402 controls the step motor 276 to move the carriage in an "x" direction which is a direction transverse to the axis 210 (FIG. 12). The stepper motor 266 moves the carriage 54 along a "y" axis which is the direction parallel the axis 210. The stepper motor 224 is adapted to rotate the ball about the axis 210 or "r" axis while the stepper motor 306 is operative to advance or retract the drilling tool 56.

Amongst other things, the controller 400 controls a spindle motor speed regulator 404 which in turn regulates the speed of the motor 308 which drives the drilling tool 56. In addition, the controller 400 provides signals to a relay for a control or valve circuit 410. It, in turn, is operative in response to commands by the controller 400 to energize or release electromechanical actuators 324 which clamp the carriage 54 in place, as well as the electromechanical actuator 346 for the brake 344 (FIG. 13) and the pneumatic actuator 70 (FIG. 12) that clamps a ball 204 within the apparatus.

In this regard, in some instances, for economy reasons, it may be desirable to do away with the pneumatic ball clamp actuator 70 and substitute a manually operable clamp in lieu thereof. In such a case, however, it would be desirable to include some sort of sensor (not shown) to determine when the ball 204 (FIG. 12) is in the apparatus and clamped in place as will be seen.

A series of three home position indicating switches 412, 414, and 416 are employed and are operative to provide input signals to the controller 400 when they are closed. The switches 412, 414 and 416 are not shown in FIGS. 12 & 13, but would be appropriately located so that the switches 412 and 414 will be closed when the carriage 54 is in a "home" position. The home position can be arbitrarily selected and according to one embodiment, it is that position of the carriage 54 when moved as far as possible toward the left front corner of the apparatus as viewed in FIG. 1. The switch 416 is adapted to be closed when the motor 308 is in a "home" position which is the lowermost position that it may attain within the apparatus. As will become apparent to those skilled in the art, a "home position" is not required for proper operation of the stepper motor 224 which rotates the ball 204 about the axis 210.

The home positions for the other circuits are required because, as can be readily recognized from the foregoing descriptions of FIGS. 15 and 17, the positioning of the various components is not accomplished via closed loop systems. Rather, open loop systems are used and that requires homing of the various components at periodic intervals to assure that their positions can be accurately controlled. Of course, if desired, closed loops or other types of positioning systems could be utilized in lieu of those disclosed.

Finally, a control panel 420 is connected to provide input information to the controller 400. It may include a key operated switch 422 which controls overall power availability to the apparatus, a start switch 424 which may be pushed to initiate a fitting and drilling operation, and a stop switch 426 which may be utilized to interrupt the operation at any desired point.

As will be seen, finger hole position information ultimately obtained by the potentiometers 104 (FIGS. 2 and 15) is ultimately provided by the control circuit illustrated in FIG. 15 and contained within the fitting apparatus 30 to the control circuit (FIG. 17) for the drilling apparatus as an input to the four axis controller 400. Assuming that the ball 204 has been properly positioned within the apparatus, the stepper motors 224, 266 and 276 are operated to move the ball to a proper position relative to the drilling tool 56 and then the feed stepper motor 306 operated to cause three drilling operations, one for each of two fingers and one for the thumb, to occur to properly drill the ball according to the finger and thumb hole set-up on the fitting apparatus 30.

Figure 18:
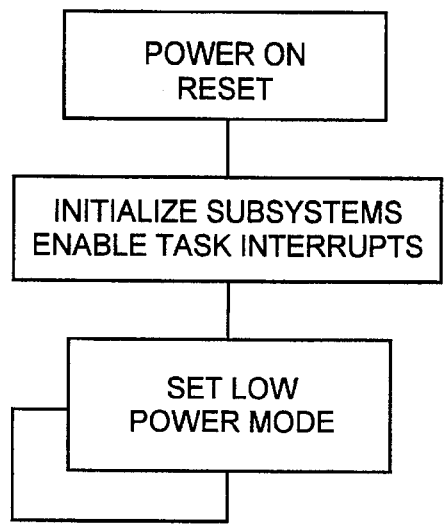

FIG. 18 shows a block diagram of the main program of the microprocessor 382 (FIG. 15). The same is extremely simple and basically amounts to no more than initializing the various subsystems, enabling the task interrupts and then reverting to a low power mode.

Figure 19:
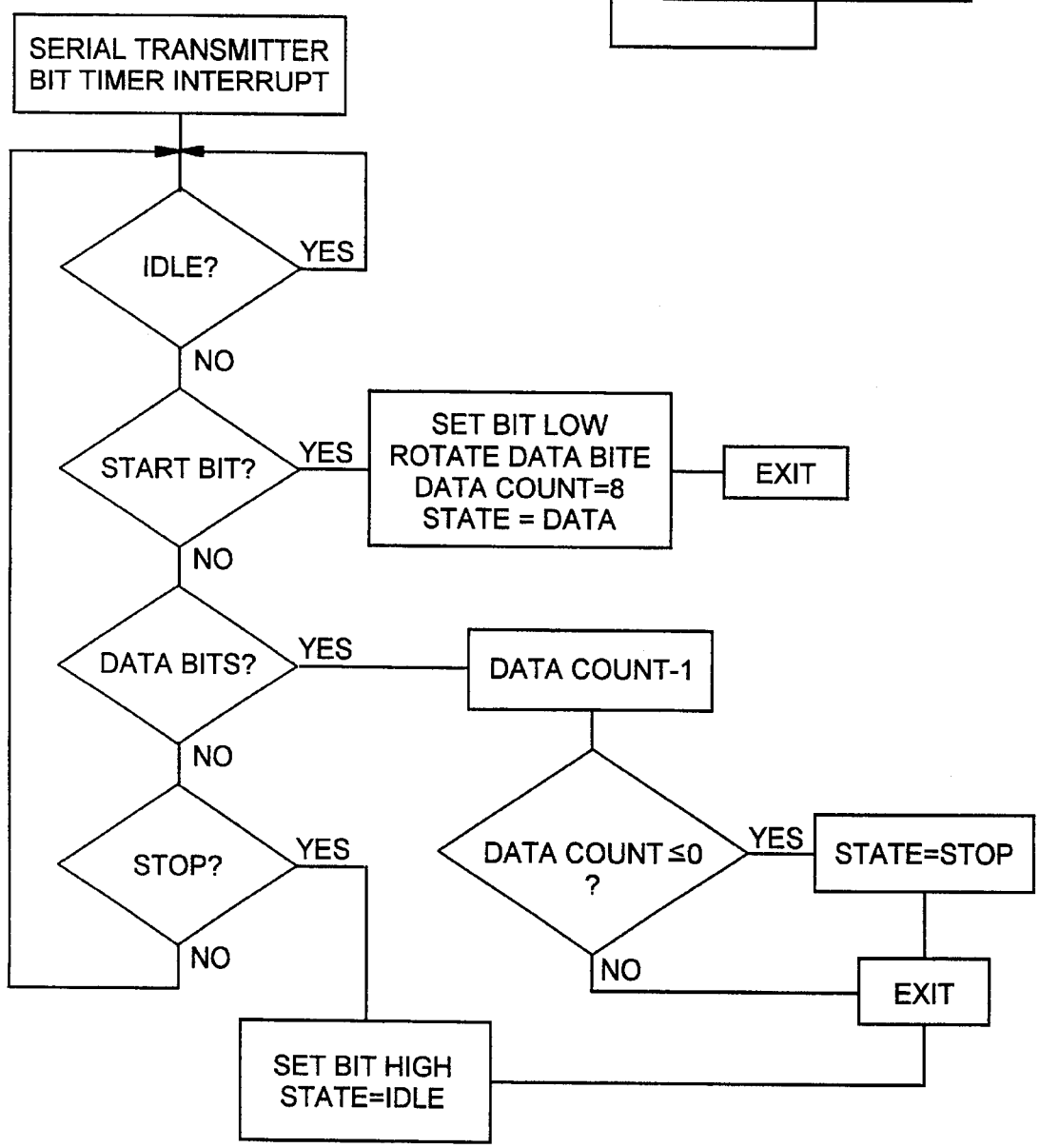

FIG. 19 illustrates a routine performed by the microprocessor 382. As alluded to previously, an RS232 serial transmission system is employed. Because of the inexpensive nature of the microprocessor 282 used, the routine illustrated in FIG. 19 is implemented therein so as to enable operation on the RS232 format.

FIGS. 20 and 21 show subroutines that are utilized during a calibration process. Referring to FIG. 20, and keeping FIG. 16 in mind, when a calibration procedure is to take place, the MIN/MAX signal goes low which provides a signal interrupt as indicated by the block 450. A determination is then made at block 452 whether the apparatus is in the calibration mode. This is accomplished by looking at the CAL MODE signal and determining whether or not it is low. If the answer is no, then the subroutine of FIG. 20 is exited as shown at block 454. However, if the apparatus is in the calibration mode, a command is given to reset the calibration table pointer. This is a pointer contained in the nonvolatile memory 384 and is represented by a block 456.

The next procedure is indicated in a block 458 and includes reading both of the potentiometers 104 at the output of the analog to digital converter 380. The values are then ultimately written in memory as illustrated by a block 460 and the subroutine exited.

Values that are written in memory or base values, at this juncture, are those with both of the finger blocks 34, 36 (FIGS. 1–3) at one extreme position of movement. These values are absolute values read from the analog to digital converter 380 and each is stored as 16 bits in a table within the non-volatile memory 384.

The subroutine illustrated in FIG. 20 will not be repeated until such time as the MAX/MIN signal first goes high and then goes low once again.

Turning now to FIG. 21, a subroutine in the calibration procedure is illustrated and which is performed every time the SAMPLE signal goes low as indicated by a block 462. As shown by a block 464, a query is made as to whether the apparatus is in a calibration mode by looking at the level of the CAL MODE signal (FIG. 16). If the answer is no, the subroutine is exited as indicated at a block 466. Conversely, if the answer is yes, at a block 468, a query is made as to whether the MIN/MAX signal is high. If the answer here is yes, the subroutine, at block 470, sets a flag within the calibration table to that effect. The MIN/MAX signal, will be returned to a high level only upon the finger blocks 34 and 36 being moved to the opposite extreme position of movement. As noted, such a signal level change can be achieved simply as a result of manual observation and the resultant closing of a switch or may be generated as part of the highly sophisticated calibration apparatus. In either event, once the flag is set calibration table, the subroutine illustrated in FIG. 21 is exited.

However, if, at the block 468, it is determined that the MIN/MAX signal is low, the routine proceeds to a block 472 wherein each of the potentiometers 104 is read. The value of each reading is subtracted from the value of the preceding reading for that particular potentiometer to provide a "delta change" value and the delta change value is then stored in eight bits of memory in the nonvolatile memory 384.

The subroutine is then exited until the next time the SAMPLE signal goes low (see FIG. 16). This will occur after the finger blocks 34 and 36 have been incremented one position, either manually or by means of an automatic apparatus. In the case of the former, the SAMPLE signal may be cause to go low by manual operation of a switch, whereas in the case of the latter, the switch may be closed ground automatically.

In any event, it will be appreciated that the subroutine of FIG. 21 will be run repetitively until a value representing position information of the corresponding block 34 or 36, and each increment of movement thereof, is stored in the nonvolatile memory 384. Each increment of movement is, of course, determined by the spacing of the teeth 128 (FIG. 4). Because absolute values are stored in the nonvolatile memory 384 only for the first two readings, and difference (delta change) values thereafter stored, it will be appreciated that the size of the nonvolatile memory 384 may be reduced considerably from that which would be required if absolute values were restored for each incremental position of each of the blocks 34 and 36.

The procedure is summarized in the following table.

TABLE 1

1. An appropriate signal generator of the type described is connected to the jack 392.

2. The MIN/MAX signal is high.

3. The finger blocks 34, 36 are moved to one extreme position of movement, preferably, the position whereat they are closest to the thumb hole.

4. The SAMPLE signal is high.

5. The CAL MODE signal is caused to go low.

6. The MIN/MAX signal is caused to go low.

7. The finger blocks 34 and 36 are moved away from the extreme position of movement (away from the thumb hole) by one positional increment such as 1/32 or 1/64 of an inch.

8. The SAMPLE signal is caused to go low and then return to a high level.

9. Steps 7 and 8 are repeated for each increment of movement until the blocks 34, 36 have been moved to the opposite extreme position of movement (preferably, the location furthest from the thumb hole) and then proceeds to the following step.

10. Cause the MIN/MAX signal to revert to the high state and then pulse the SAMPLE signal low and then high to indicate that this is the final sample to mark the end of the calibration table.

11. Return the CAL MODE signal to a high level.

12. Unplug the calibrator unit.

The number of bits of information contained in the nonvolatile memory 384 may be shown from the following table.

TABLE 2

| WORD DESCRIPTIONS | BITS |
| --- | --- |
| Minimum right value | 16 |
| Minimum left value | 16 |
| First right delta change value | 8 |
| First left delta change value | 8 |
| Second right delta change value | 8 |
| Second left delta change value | 8 |
| . . . nth right delta change value | 8 |
| . . . nth left delta change value | 8 |
| End of table marker - right | 8 |
| End of table marker - left | 8 |

Figure 22:
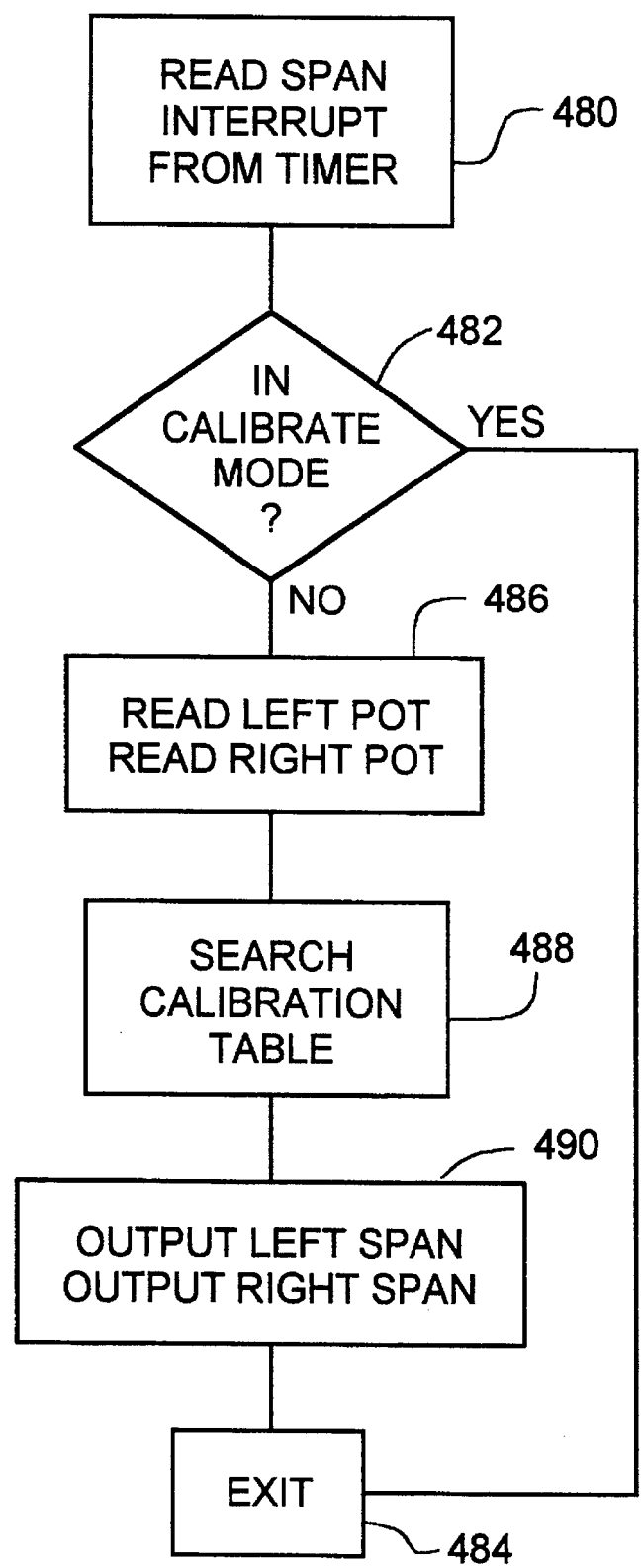

The subroutine illustrated in FIG. 22 is performed to provide fitting information from the fitting apparatus 30 to the drilling apparatus. An internal timer within the microprocessor generates a "read span" interrupt each half second as indicated by a block 480. Initially, at a block 482, an inquiry is made as to whether the system is in the calibrate mode by looking at the level of the CAL MODE signal (FIG. 16). If yes, the subroutine in FIG. 22 proceeds to exit as indicated by block 484. If no, both of the potentiometers 104 are read as indicated by a block 486. That is followed by a search of the calibration table 488. Looked for is a value contained in the calibration table that is the same as or closest to the value that is read during the performance represented by the block 486.

Once the determination is made, values corresponding to the left span and to the right span are outputted to the circuitry illustrated in FIG. 17. This operation is indicated by the block 490.

Once that is accomplished, the subroutine is exited as indicated at the block 484. At this point, then, the set-up on the fitting apparatus 30 and the relative positioning of the finger blocks 34 and 36 in relation to the thumb hole have been provided to drilling apparatus.

Figure 23:
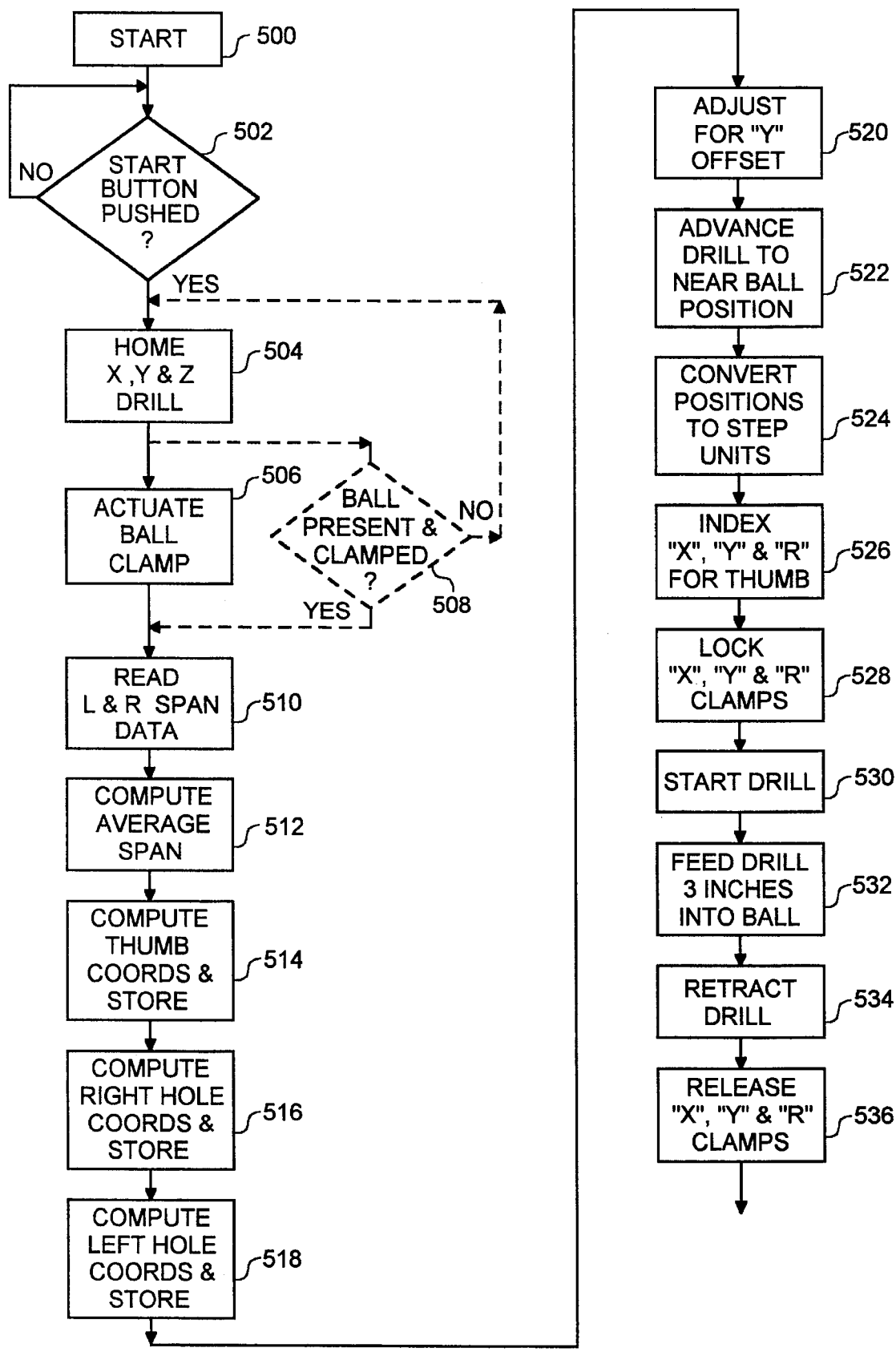
Figure 24:
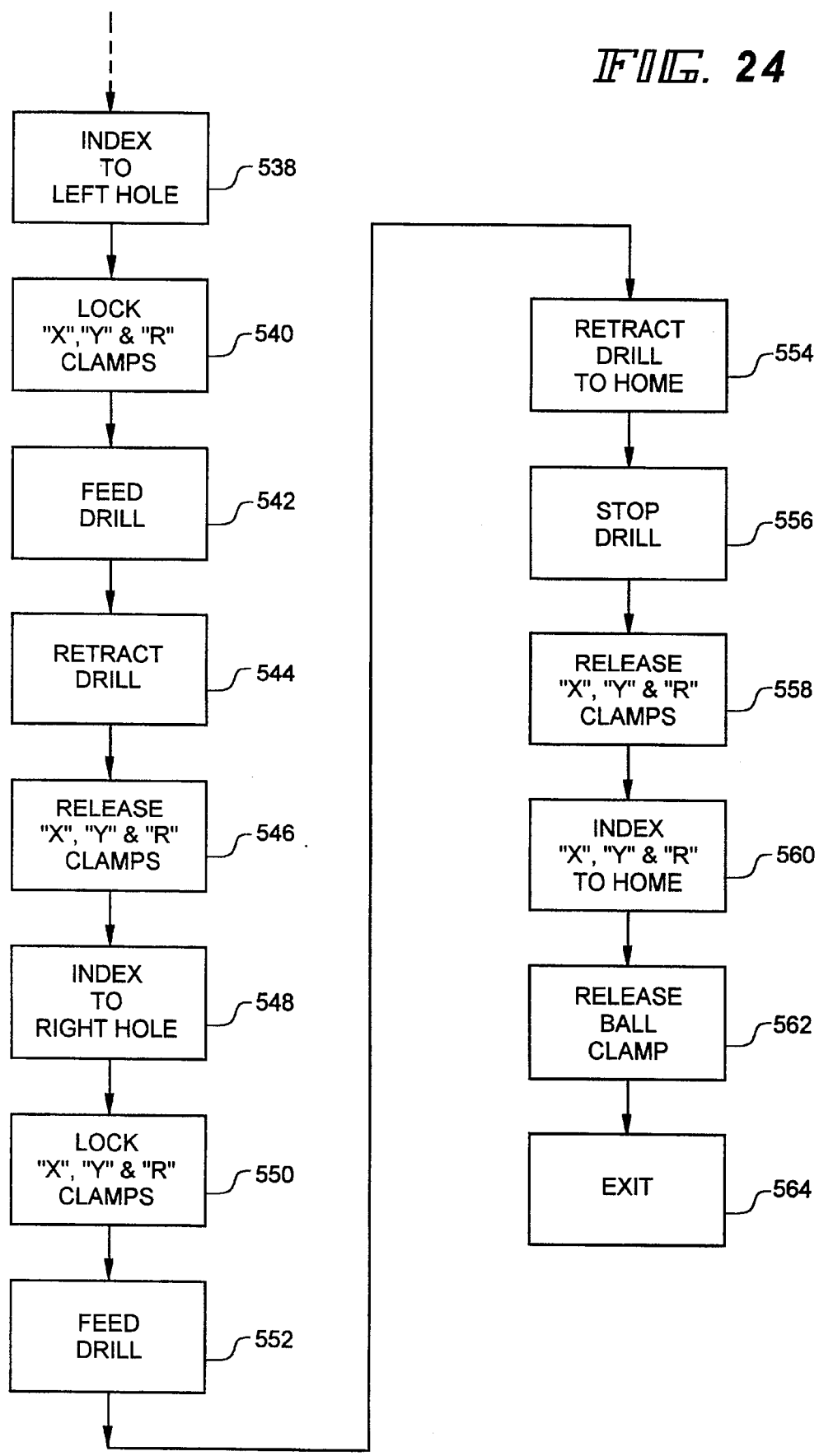

Turning now to FIGS. 22 and 23, the manner in which the four axis controller 400 (FIG. 17) utilizes the information to drill a ball will be described. A first step or start command shown at block 500 occurs, for example, when the key switch 422 (FIG. 17) is turned on. At decision block 502, the question is asked whether the start switch 424 (FIG. 17) has been pushed. If no, the program loops back to the beginning. If yes, commands are issued to cause the carriage to go to the "x" and "y" home positions and to cause the drill 56 to be moved to its fully retracted or home position (block 504).

If the embodiment is one wherein provision is made for automatically clamping a ball in place, as, for example, through the use of the cylinder 70 (FIG. 12) the next step is to actuate the cylinder 70. This is shown at block 506.

Alternatively, if a manual clamp is used to clamp the ball, a switch associated therewith maybe queried to determine whether a ball is present and clamped as shown by a decision block 508. If no, the routine returns to the homing step 504. If yes, the routine proceeds to the step shown at block 510 which is to read the left and right span data being received from the fitting apparatus 30. The step illustrated by block 510 is also the one to which routine proceeds if an automatic ball clamp is utilized and the ball is clamped per block 506.

In this particular apparatus, the span is the distance measured parallel to the "x" axis between the closest point of the thumb hole and the closest point of the hole in either the right or left block 34, 36. It is not a direct point to point measurement.

Having read the left and right span data, the next step is shown at block 512 and is the computing of the average span. The average span is equal to the sum of the left and right spans divided by 2.

The purpose of this step is to nominally locate the finger hole triangle to be drilled in the ball at a point so as to be centered on the index spot placed on the ball at the time of its manufacture.

Following the computation of the average span, the next step is shown at 514 and is the computation of the thumb coordinates. To simplify the drilling operation, the "x" and "y" thumb coordinates are taken to be zero while the rotational thumb coordinate is determined by dividing the average span by two. These three pieces of information are stored at the conclusion of the computational step 514.

The next step is shown at block 516 and amounts to computing the right hole position and then storing the information. The right rotational coordinate is defined as the right span distance minus the quantity of the average span divided by 2. The right hand "x" coordinate is equal to the diameter of the drill bit 56 divided by 2, plus the bridge width divided by 2. It will be recalled that the bridge is the distance between the near edges of the two finger holes. This distance will be determined by the physical construction of the fitting apparatus itself and in a preferred embodiment will be taken to be one-half inch. The right "y" coordinate is taken to be 0.

Once the foregoing information is stored, the routine proceeds to the next step which is the computation of the left hole coordinates and the storage thereof. This is represented by a block 518. The left rotational coordinate is defined as the left span minus the quantity of the average span divided by 2. The left "x" coordinate is equal to the bit diameter 56 divided by 2 plus the bridge width divided by 2. The left "y" coordinate is taken to be 0.

Following the storage of the left hole coordinates, the routine proceeds to an adjustment procedure represented by a block 520. This is an adjustment for the so-called thumb "y" offset. This is an adjustment for pitch which is the distance between the center line of a finger or thumb hole and a parallel radius of the ball as mentioned previously.

In this procedure, the average span as earlier calculated is looked at. If it is no more than $3^{19}/_{32}$", the offset is taken to be 0. If, however, the average span is in the range of $3^{19}/_{32}$" to $3^{26}/_{32}$", the offset is $\frac{1}{4}$". If the average span is greater than $3^{26}/_{32}$", the offset is taken to be $\frac{3}{8}$". The thumb rotational coordinate is then recalculated to be that previously calculated at block 514 minus the offset selected based on average span while the "y" coordinate for the thumb is then adjusted to be equal to the selected offset. However, other tables of variables reflecting ball fitting strategies could be implemented at this point in the routine.

Following the adjustment for the "y" offset, the drill is advanced to a position near the ball, but not yet contacting the ball. This is indicated by a block 522. Following this initial positioning of the drill, the position information, which up until now has been stored in binary or hexadecimal form representing dimensions in inches as, for example, $\frac{1}{32}$" increments, is converted to mechanical step units. The geometry of the apparatus makes it clear how many times each of the stepping motors 224, 266, 276 and 306 must be stepped to achieve a desired dimensional change. This conversion process is represented by a box 524.

Having converted the position information to motor step units, the next step is shown at box 526 and is to index the ball to the "x", "y" and rotational coordinates for the thumb hole. Once the indexing is accomplished, the apparatus is commanded, as represented by the block 528, to clamp the table wings 320 (FIGS. 13 and 14) which are the "x" and "y" clamps, and to engage the brake 344 which is the "r" clamp.

With all components firmly held in position, thereby locking the ball to be drilled into position, the drilling operation may proceed. At a block 530, a command is issued to start the drill, that is, to initiate operation of the motor 308. Once the motor 308 is operating, the drill bit 56 is advanced 2½" or 3" into the ball as illustrated by a block 532.

Having done that, the drill is then retracted to its "near the ball", as opposed to home, position as indicated by a block 534 and the "x", "y" and "r" clamps are released as shown by a step 536.

The program proceeds to the flow diagram illustrated in FIG. 23 and the next step is shown at a block 538 wherein the carriage and the ball rotational apparatus are indexed to the positions for the left hole. Once that is accomplished, the "x", "y" and "r" clamps are again engaged as shown by a block 540. The hole is drilled (542), the drill then retracted to the "near the ball" position (544) and the "x", "y", and rotational clamps released (546), in that sequence.

At this point, the apparatus then proceeds, at block 548, to index to the right hole coordinates. Once the proper positioning has been achieved, the "x", "y" and rotational clamps are again locked as illustrated by a block 550. Again, the drill is fed into the ball to drill the hole at block 552 and following that, the drill is retracted as shown by a block 554. In this particular case, however, the drill is retracted to the home position, rather than merely to a position just outside of the ball.

The drill is then stopped by deenergizing the motor 308 as shown at a block 556 and the "x", "y" and rotational axis clamps are then released (558). At this point, the various stepper motors are commanded to index the drilling apparatus components to the "x", "y" and "r" home positions as shown at a block 560. Once this is attained, the ball clamp (cylinder 70) is released as shown at a block 562. The program is then exited as shown at block 564.

At this stage, the cover 50 of the apparatus may be lifted and the ball removed. The inserts selected from the group 150 (FIGS. 8 and ) are then inserted in the finger and thumb holes of the ball in the same angular positions in the holes in the ball as they were placed in the holes in the fitting apparatus 30. To the extent that the spherical surfaces of the inserts might require trimming, they can be trimmed at this point and a finished ball results.

It will be readily appreciated that a fitting and drilling apparatus made according to the invention allows fitting and drilling of balls at the point of sale and lends itself to mass merchandising. The apparatus is easily operated by a sales clerk with minimal training and provides extremely accurate fitting of the ball to a bowler as well as drilling of the ball to the fitted specifications. Consequently, the delays heretofore experienced in obtaining a custom fitted ball for bowling are eliminated. It is no longer necessary to obtain a ball and then wait for a pro shop to first fit the ball and later drill it. Using the fitting and drilling apparatus of the invention, a ball may be purchased, fitted and drilled and be ready for use in a bowling game, literally within minutes.

We claim:

1. Apparatus for fitting a bowling ball to the hand of a user, comprising:

a first finger block including a first bore;

a second finger block including a second bore;

a frame;

means including a third bore in said frame;

means mounting said finger blocks in on said frame in generally side by side relation and for movement toward and away from said third bore; and means in said frame and connected to said finger blocks for generating a signal representative of the distance between each said finger block and said third bore.

2. The apparatus of claim 1 wherein said third bore means is stationary relative to said frame.

3. The apparatus of claim 1 wherein said bores are all sized to receive inserts from a set of inserts, each insert of the set having a finger hole therein.

4. The apparatus of claim 3 wherein said inserts are generally cylindrical and the finger holes in at least some of said inserts are located eccentrically with respect to the cylindrical axis of the corresponding insert.

5. The apparatus of claim 4 wherein all of said bores have the same cross-sectional size and shape.

6. The apparatus of claim 1 wherein said frame is in the size and shape of a bowling ball.

7. The apparatus of claim 6 wherein said finger blocks are pivoted to said frame about a common axis which extends through the center of said bowling ball.

8. The apparatus of claim 6 wherein the center of said bowling ball and said third bore define a medial plane and said first and second finger blocks are movable in respective planes on either side of said medial plane, said respective planes being parallel to said medial plane.

9. The apparatus of claim 1 wherein said generating means comprises two potentiometers, one connected to each of said blocks.

10. The apparatus of claim 9 wherein each of said potentiometers includes a rotatable wiper shaft and each of said blocks is pivoted to said frame and connected to the wiper shaft of the respective potentiometer.

11. The apparatus of claim 10 wherein each said block is pivoted to said frame for rotation about an axis and each potentiometer has its wiper shaft displaced to one side of said axis, and means, including a positive drive connection extending between each said wiper shaft and the associated block.

12. The apparatus of claim 11 wherein each said positive drive connection includes a timing belt.

13. The apparatus of claim 1 further including a latch mechanism for each of said finger blocks for latching the finger block in any of a plurality of positions on the frame.

14. Apparatus for fitting a bowling ball to the hand of a user comprising:

a frame;

a reference finger hole on said frame;

at least one finger block pivoted on said frame for movement about an axis toward and away from said reference finger hole, said finger block including a bore;

a releasable latch for normally latching said finger block in any of a plurality of different positions relative to said reference finger hole; and means for selectively disabling said latch to allow said finger block to be freely moved between said position without releasing said latch.

15. The apparatus of claim 14 wherein said releasable lock comprises an arcuate array of teeth centered on said axis and adjacent said finger block, a lever mounted on said block for movement relative thereto and having at least one tooth that may be matingly received in said array, and a spring biasing said lever so that said at least one tooth is received in said array, said lever being movable against the bias of said spring to move said at least one tooth out of said array to release said latch.

16. The apparatus of claim 15 wherein said disabling means includes an actuator mounted on said lever and movable between an enabling position and a disabling position thereon, said actuator, when in said enabling position, allowing said spring to move said lever and said at least one tooth into said array, and when in said disabling position, limiting movement of said lever and said at least one tooth toward said array to prevent said at least one tooth from entering said array.

17. The apparatus of claim 16 wherein said finger block carries a first detent surface and said actuator carries a second detent surface which is movable into and out of engagement with said first detent surface, said detent surfaces being engaged when said actuator is in said disabling position.

18. The apparatus of claim 17 wherein said actuator is pivoted to said lever and said first detent surface overlies said lever.

19. Apparatus for drilling holes in a bowling ball comprising:

a table having an upper surface;

a carriage;

a boring tool mounted beneath said table upper surface;

means mounting said carriage and said boring tool on said table for relative movement in two material transverse direction thereon;

an upwardly opening ball receiving pocket on said carriage and adapted to receive and support, under the influence of gravity, a ball above said upper surface and in a position to be intercepted by said boring tool;

means for reciprocating said boring tool through said pocket and array from said pocket;

an arm mounted on said carriage and in a position overlying said pocket, said arm including a first ball gripping surface rotatable about a generally horizontal axis;

a second ball gripping surface on said carriage and rotatable about said generally horizontal axis;

said ball gripping surfaces being on opposite sides of said pocket;

means for rotating at least one of said ball gripping surfaces about said generally horizontal axis; and means for effecting relative movement of said ball gripping surfaces toward and away from each other along said generally horizontal axis;

said generally horizontal axis lying slight above a parallel, generally horizontal plane that is located to pass through the center of a ball when a ball is resting in said pocket, whereby when a ball is resting in said pocket and said ball gripping surfaces are moved toward each other, the ball will be lifted out of said pocket until its center is on said generally horizontal axis.

20. The apparatus of claim 19 wherein at least one of said ball gripping surfaces is a circular surface centered on said generally horizontal axis.

21. The apparatus of claim 19 wherein said arm is mounted to said carried by a horizontal pivot, the axis of said pivot being generally transverse to said generally horizontal axis; whereby said arm may be pivoted between said position overlying said pocket and a second position allowing free access to said pocket.

22. The apparatus of claim 19 wherein said arm carries an indexing means so that a ball in said pocket may be properly located therein by aligning a mark on the ball with said indexing means.

23. The apparatus of claim 22 wherein said indexing means comprises an aperture in said arm.

24. The apparatus of claim 23 wherein said aperture is vertically aligned with the mid point of said pocket.

25. The apparatus of claim 19 wherein said means mounting said carriage and said boring tool for relative movement mount said carriage on said table upper surface.

26. The apparatus of claim 19 further including lock means for locking said carriage to said table during operation of said boring tool.

27. Apparatus for drilling holes in a bowling ball comprising:

a table having an upper surface;

an upwardly opening ball supporting pocket on said upper surface;

a boring tool mounted below said table for reciprocation in a generally vertical direction in a path intersecting said pocket;

means for moving said tool in said path;

means for effecting relative movement between said pocket and said boring tool in two mutual transverse directions, both generally transverse to said vertical direction;

generally horizontally moveable ball gripping surfaces on opposite sides of said pocket;

means for moving said ball gripping surfaces toward each other to engage a ball in said pocket and grip the same;

said ball gripping surfaces having their effective gripping surfaces centered at location just to the side of the center of a ball supported in said pocket opposite said pocket so that when said ball gripping surfaces are moved toward each other, a ball engaged thereby will be moved slightly out of contact with said pocket; and control means for said apparatus.

28. The apparatus of claim 27 wherein said ball gripping surfaces are mounted on said table for rotation about a common axis, and means for moving said ball gripping surfaces about said common axis to index a ball relative to said boring tool.

29. The apparatus of claim 27 further including a carriage on said upper surface, said pocket being mounted on said carriage; said means for effecting relative movement being operative to move said carriage on said upper surface.

30. The apparatus of claim 29 further including means for locking said carriage to said table.

31. The apparatus of claim 27 further including a ball indexing means associated with said pocket whereby a ball may be initially positioned in a predetermined position in said pocket.

32. The apparatus of claim 28 further including input means for providing ball hole location information to said apparatus so that after a ball is located in said pocket, sequentially the ball will be gripped by said ball gripping surfaces; the ball will be indexed about said common axis and relative movement between said pocket and said boring tool in said mutual transverse directions effected to locate the ball relative to the boring tool, and the boring tool reciprocated toward and away from a ball in said pocket.

33. The apparatus of claim 32 wherein said input means includes a first finger block including a first bore;

a second finger block including a second bore;

a frame;

means including a third bore in said frame;

means mounting said finger blocks in on said frame in generally side by side relation and for movement toward and away from said third bore; and means in said frame and connected to said finger blocks for generating a signal representative of the distance between each said finger block and said third bore.

34. The apparatus of claim 33 wherein said frame is configured in the size and shape of a bowling ball, and a flexible electric cable connecting said signal generating means to said control means, whereby said frame may be held by a bowler and "phantom" thrown to test the feel of a fitted ball.

* * * * *